United States Patent
Ouyang et al.

(10) Patent No.: US 9,973,551 B2
(45) Date of Patent: May 15, 2018

(54) SYSTEM, METHOD, AND LOGIC FOR MANAGING CONTENT IN A VIRTUAL MEETING

(71) Applicant: CISCO TECHNOLOGY, INC., San Jose, CA (US)

(72) Inventors: Hua Ouyang, Jiangsu (CN); Ruwei Liu, Anhui (JP); Ye Zhao, Jiangsu (CN); Juhua Yun, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 14/618,916

(22) Filed: Feb. 10, 2015

(65) Prior Publication Data
US 2016/0234268 A1    Aug. 11, 2016

(51) Int. Cl.
*H04L 29/06* (2006.01)
*H04L 29/08* (2006.01)

(52) U.S. Cl.
CPC .......... *H04L 65/403* (2013.01); *H04L 67/22* (2013.01); *H04L 67/24* (2013.01)

(58) Field of Classification Search
CPC ........ H04L 65/403; H04L 67/22; H04L 67/24
See application file for complete search history.

(56) References Cited

U.S. PATENT DOCUMENTS

| | | | |
|---|---|---|---|
| 8,230,343 B2 | 7/2012 | Logan et al. | |
| 2004/0190700 A1* | 9/2004 | Cutaia | H04M 3/42221 379/202.01 |
| 2004/0203677 A1* | 10/2004 | Brown | H04M 3/42221 455/416 |
| 2005/0053214 A1* | 3/2005 | Reding | H04M 3/387 379/202.01 |
| 2007/0188901 A1* | 8/2007 | Heckerman | G09B 19/00 360/23 |
| 2008/0092168 A1 | 4/2008 | Logan et al. | |
| 2008/0313297 A1* | 12/2008 | Heron | H04L 12/581 709/207 |
| 2009/0125589 A1* | 5/2009 | Anand | H04L 65/1083 709/204 |
| 2009/0300520 A1 | 12/2009 | Ashutosh et al. | |
| 2010/0316207 A1* | 12/2010 | Brunson | H04M 3/56 379/202.01 |

(Continued)

FOREIGN PATENT DOCUMENTS

WO    WO 2014013356 A1 *    1/2014    .............. H04W 4/12

*Primary Examiner* — Dustin Nguyen
*Assistant Examiner* — Javier O Guzman

(57) ABSTRACT

An example method is provided and includes detecting, during a virtual meeting session, a plurality of events associated with each of a plurality of endpoints connected to the virtual meeting session. Each of the endpoints may be associated with a user identifier. The method also includes determining a status value for each of the plurality of endpoints based analyzing one or more of the plurality of events against a metric. The method also includes storing information related to the plurality of events. An output representative of at least one portion of the virtual meeting session is generated based on the stored information. The output identifies a classification of attentiveness associated with a user identifier for the at least one portion of the virtual meeting session.

21 Claims, 14 Drawing Sheets

(56) References Cited

U.S. PATENT DOCUMENTS

| | | | |
|---|---|---|---|
| 2011/0113351 A1* | 5/2011 | Phillips | G06Q 10/10 |
| | | | 715/757 |
| 2011/0267419 A1* | 11/2011 | Quinn | H04N 7/15 |
| | | | 348/14.08 |
| 2012/0162349 A1* | 6/2012 | Alexandrov | H04N 7/155 |
| | | | 348/14.03 |
| 2013/0007066 A1 | 1/2013 | Doganata et al. | |
| 2013/0339431 A1* | 12/2013 | Yannakopoulos | H04L 12/1827 |
| | | | 709/204 |
| 2014/0365568 A1 | 12/2014 | Huang et al. | |
| 2015/0134748 A1 | 5/2015 | Zhang et al. | |
| 2015/0154291 A1* | 6/2015 | Shepherd | G06F 17/30861 |
| | | | 707/748 |
| 2016/0050175 A1 | 2/2016 | Chaudhry et al. | |

* cited by examiner

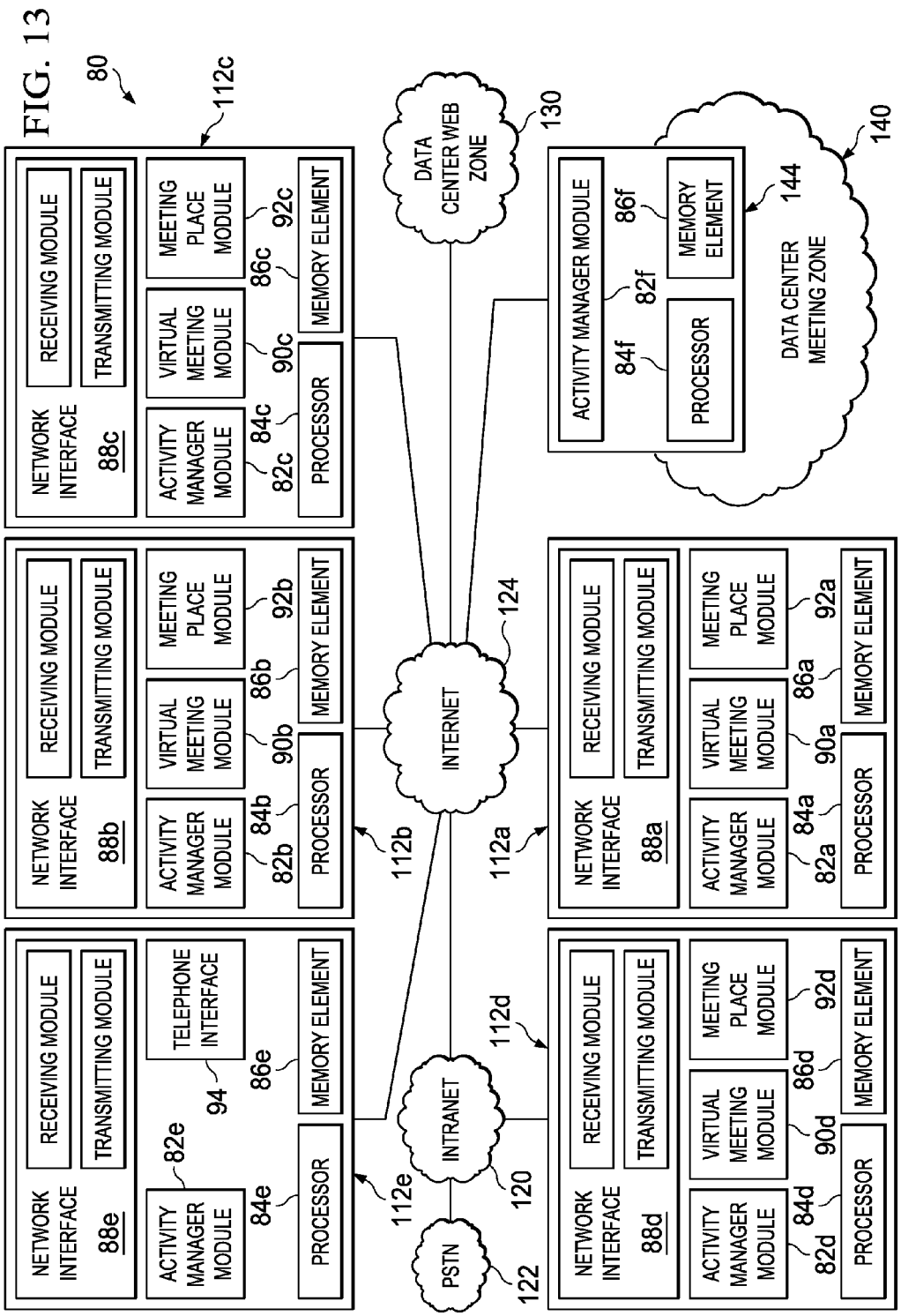

SYSTEM, METHOD, AND LOGIC FOR MANAGING CONTENT IN A VIRTUAL MEETING

TECHNICAL FIELD

The present disclosure relates generally to communication systems and, more particularly, to managing endpoint activity in a virtual meeting.

BACKGROUND

Modern computing enables users, which may be remote from one another, to collaborate. For example, virtual meetings allow such users to meet in an online platform to share documents, applications, communication, and the like. Some online platforms (or other platforms or applications) may enable a user to detect whether other users are present in the virtual meeting. While some users may be very active within a meeting (e.g., a presenter), other users may not be as active. Users that are not active (or are not paying attention) within the meeting may fail to receive (e.g., fail to view or hear) or otherwise miss content that is provided within the virtual meeting.

BRIEF DESCRIPTION OF THE DRAWINGS

To provide a more complete understanding of the present disclosure and features and advantages thereof, reference is made to the following description, taken in conjunction with the accompanying Figures, wherein like reference numerals represent like parts, in which:

FIG. 13 is a simplified schematic diagram illustrating possible details related to an example infrastructure of the communication system in accordance with one embodiment.

DESCRIPTION OF EXAMPLE EMBODIMENTS OF THE DISCLOSURE

Overview

Figure 1:
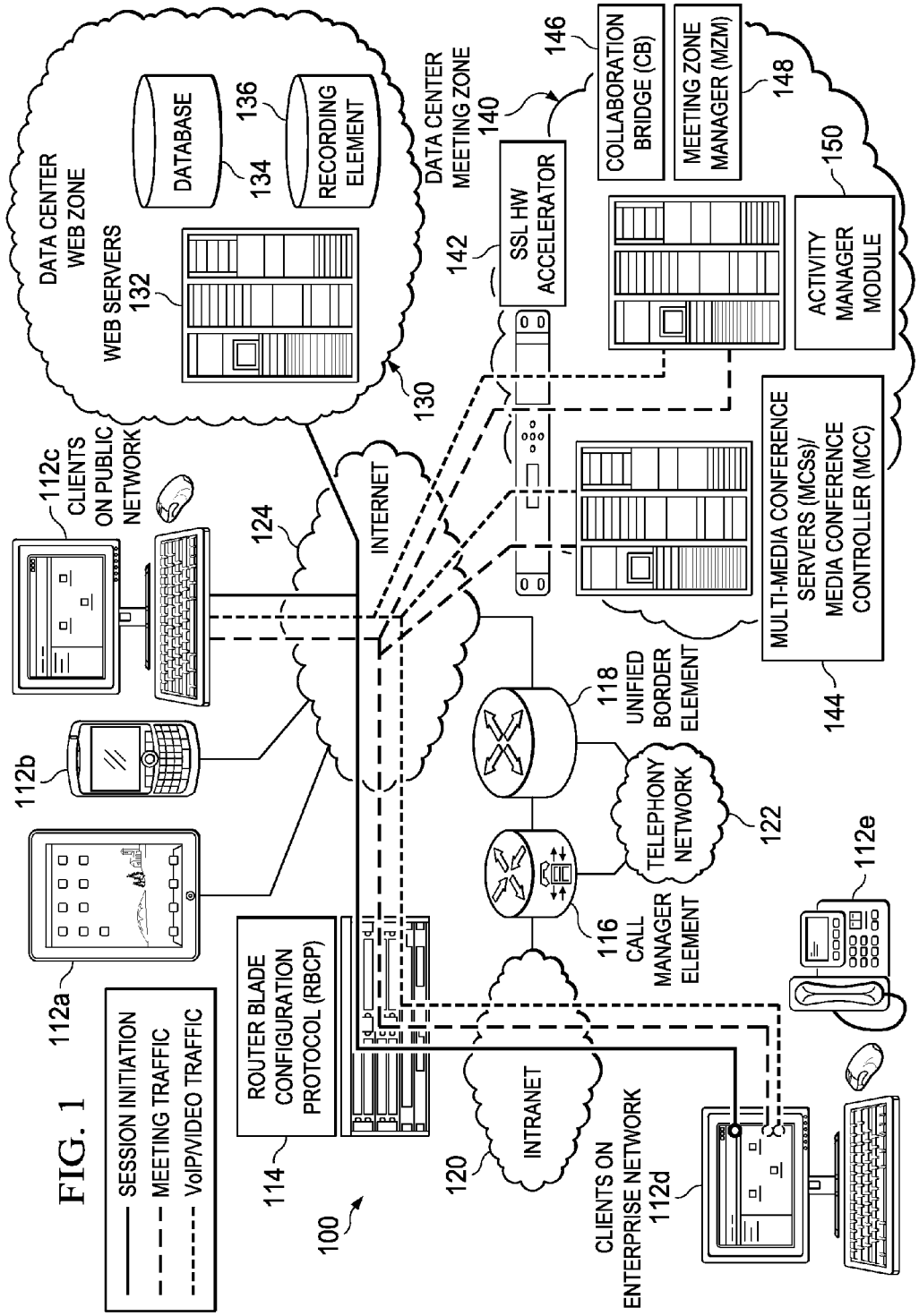
FIG. 1 is a simplified schematic diagram of a communication system for managing endpoint activity in a virtual meeting in accordance with one embodiment of the present disclosure.

In one example, a method comprises detecting, during a virtual meeting session, a plurality of events associated with each of a plurality of endpoints connected to the virtual meeting session; determining a status value for each of the plurality of endpoints based on analyzing one or more of the plurality of events against a metric; storing information related to the plurality of events; and generating an output representative of at least one portion of the virtual meeting session based on the stored information. In some embodiments of the method, the output identifies a classification of attentiveness associated with a user identifier for the at least one portion of the virtual meeting session.

In another example, one or more non-transitory media includes code for execution and when executed by one or more processors performs operations comprising: detecting, during a virtual meeting session, a plurality of events associated with each of a plurality of endpoints connected to the virtual meeting session;
determining a status value for each of the plurality of endpoints based on analyzing one or more of the plurality of events against a metric; storing information related to the plurality of events; and generating an output representative of at least one portion of the virtual meeting session based on the stored information. In some embodiments of the one or more non-transitory media, the output identifies a classification of attentiveness associated with a user identifier for the at least one portion of the virtual meeting session.

In yet another example, an apparatus comprises: a memory element configured to store electronic code, a processor operable to execute instructions associated with the electronic code, and an activity manger module to interface with the processor and further to: detect, during a virtual meeting session, a plurality of events associated with each of a plurality of endpoints connected to the virtual meeting session; determine a status value for each of the plurality of endpoints based on analyzing one or more of the plurality of events against a metric; store information related to the plurality of events; and generate an output representative of at least one portion of the virtual meeting session based on the stored information, wherein the output identifies a classification of attentiveness associated with a user identifier for the at least one portion of the virtual meeting session.

In still another example, an apparatus comprises: a memory element configured to store electronic code, a processor operable to execute instructions associated with the electronic code, and an activity manger module that when executed by the processor performs operations comprising: detecting, during a virtual meeting session, a plurality of events associated with each of a plurality of endpoints connected to the virtual meeting session; determining a status value for each of the plurality of endpoints based on analyzing one or more of the plurality of events against a metric; storing information related to the plurality of events; and generating an output representative of at least one portion of the virtual meeting session based on the stored information. In some embodiments of the apparatus, the output identifies a classification of attentiveness associated with a user identifier for the at least one portion of the virtual meeting session.

Example Embodiments

FIG. 1 is a simplified block diagram illustrating a communication system 100 for managing endpoint activity in a virtual meeting in a meeting session environment. In specific implementations, communication system 100 can be provisioned for use in generating, managing, hosting, and/or otherwise providing virtual meetings. In certain scenarios (many of which are detailed below), communication system 100 may be configured for managing endpoint activity in a virtual meeting. The architecture of communication system 100 is applicable to any type of conferencing or meeting technology such as video conferencing architectures (e.g., Telepresence™), web cam configurations, smartphone deployments, personal computing applications (e.g., Skype™), multimedia meeting platforms (e.g., Meeting-Place™, WebEx™, other virtual meeting clients, etc.), desktop applications, or any other suitable environment in which video data is sought to be managed.

Communication system 100 may include any number of endpoints 112a-e that can achieve suitable network connectivity via various points of attachment. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN).

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC) 144, a collaboration bridge 146, a meeting zone manager 148, and an activity manager module 150. As a general proposition, each MCS can be configured to coordinate video and voice traffic for a given virtual meeting. Additionally, each MCC can be configured to manage the MCS from data center meeting zone 140. Each of endpoints 112a-e can be provisioned with one or more virtual meeting applications. A virtual meeting application may comprise, e.g., a virtual meeting client, an activity manager module, or both (operably coupled to one another). A virtual meeting client is operable (e.g., by an endpoint) to establish a connection to a virtual meeting session. The activity manager module is operable to, among other things, manage endpoint activity in a virtual meeting, e.g., by analyzing data generated by endpoint to determine a status value associated with the endpoint.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones. Also depicted in FIG. 1 are a number of pathways (e.g., shown as solid or broken lines) between the elements for propagating meeting traffic, session initiation, and voice over Internet protocol (VoIP)/video traffic.

Semantically, the virtual meeting application is a client and server application. In some embodiments, the virtual meeting application may be a web-based application. A client module can be loaded onto an end user's endpoint via one or more webpages. A software module (e.g., a plug-in application, or an stand-alone application) can be delivered to a respective endpoint via the webpages. The software can be downloaded (or suitably updated) before participating in the meeting. If the software module were already resident on the end user's endpoint (e.g., previously downloaded, provisioned through any other type of medium (e.g., compact disk (CD))), then while attempting to participate in a virtual meeting, that software module would be called to run locally on the endpoint. This allows a given endpoint to establish a communication with one or more servers (e.g., provisioned at data center meeting zone 140 and/or data center web zone 130).

In order to initiate joining a virtual meeting session (also referred to as a 'virtual meeting'), an endpoint may connect to any point of attachment. Hence, a client (e.g., a virtual meeting application) can perform appropriate operations to join a previously scheduled virtual meeting. The endpoint can be redirected to data center meeting zone 140 (as shown in FIG. 1). The meeting zone manager 148 can direct the endpoint to connect to a specific collaboration bridge server for joining the upcoming virtual meeting session. If the meeting has VoIP (voice)/video streams, then the endpoint also connects to a given server (e.g., an MCS) to receive those streams. The client is operably connected to the virtual meeting session (i.e., has completed joining the meeting) when client connected only by voice, only by video, or by integrated voice and video. Operationally, when the client joins the virtual meeting session (e.g., and launches integrated voice and video) there are two connections being established to the collaboration bridge and to the MCS. For the collaboration bridge, one connection is established to send data and a second connection is established to receive data. For the MCS, one connection is established for control and the second connection is established for data. As the virtual meeting session begins, the meeting host may initially have control of the meeting (i.e., by default). The virtual meeting session is operational between the endpoint and other endpoint devices, which followed a similar initiation protocol to join the virtual meeting session.

Static data can be stored in data center web zone 130. For example, the scheduling data, the login information, the branding for a particular company, the schedule of the day's events, etc. can all be provided in data center web zone 130. Once the virtual meeting session has begun, any meeting experience information can be coordinated (and stored) in data center meeting zone 140. For example, if an individual were to share a document, or to pass the ball (i.e., pass control of the meeting), then that meeting experience would be managed by data center meeting zone 140. In a particular implementation, data center meeting zone 140 is configured to coordinate the activity management activities with endpoints 112a-e (e.g., via software modules). For example, if an endpoint generated an event, then the event data (or metadata) would be managed by data center meeting zone 140. Details concerning that possible implementation are described below with reference to FIG. 13.

The systems and methods disclosed herein can detect (and/or identify) potentially missed content for each participant (also referred to as a user) in a virtual meeting and generate a custom output for each participant based on the potentially missed content for the corresponding participant. Such systems and methods go beyond merely recording whether a participant is present at various points in time during the virtual meeting. In particular, the custom output may further include results of analyzing a plurality of events against metrics indicative of a participant's attentiveness at various points during the meeting. Thus, the output may be customized based on identifying that a participant (e.g., a participant that requested the output) is referenced in a representation (e.g., a recording including metadata) of a virtual meeting (e.g., identifying that the participant was connected to the meeting based on an identifier corresponding to the participant). In some cases, the system can distinguish (e.g., based on metrics) that although a user is present in the meeting, the user is not attentive to the meeting content. The metrics may relate to, e.g., network connectivity, power level (e.g., battery level), receipt of a communication (e.g., phone call, text, instant message, and the like), engagement, responsiveness, and/or receipt of an input. When a meeting has ended, an activity record may be used to identify or estimate (for various points in the virtual meeting) whether the participant is able to view and/or hear meeting content based on various metrics. For example, output may be customized to only include portions where the user was associated with a particular status (e.g., active or inactive). Such a system is distinguished from other systems that may utilize activity of users in a virtual meeting to identify relative importance of content shared in a meeting. Systems disclosed herein go beyond such a system and determine (e.g. based on events and metrics to output a status) whether a user is paying attention to shared content, regardless of the importance of the content.

An event includes data that is generated based on a state and/or a change in state of an endpoint. An event may be formatted as a data object, a message, an event object, a string, an identifier, and the like. In some embodiments, an event may include a timestamp of a time at which the event was generated and/or received. The change in state may relate to hardware and/or software of an endpoint. For example, a change in hardware may include removing hardware, adding hardware, and/or changing a configuration of the hardware (e.g., activate, deactivate). A change in software may correspond to adding (e.g., installing), removing (e.g., uninstalling), and/or changing the configuration of software (e.g., change in a variable). In some examples, changing the configuration includes, e.g., changing a setting within software (e.g., a virtual meeting application and/or an activity manager module) or activating a control (e.g., receiving an input at a user interface component). When an endpoint detects a change in state of hardware and/or software on the endpoint, the endpoint may generate an event corresponding to the change (and/or state). Other examples of the events include receipt of input from an input device. Input devices include (but are not limited to) a mouse, a keyboard, camera, a haptic input device, a touchscreen, and the like. When an endpoint receives an input from an input device (and/or a change in state of an input device), the endpoint may generate an event corresponding to the input (and or the change in state). In other examples, an event may be generated by the endpoint when a change is detected regarding execution of a process. For example, when a process is initiated or terminated, an endpoint may generate a corresponding event. In general, an endpoint may generate an event based on changes in any system coupled to the endpoint (e.g., based on detecting presence of a particular state and/or based on detecting absence of the particular state). For example, the absence of input (e.g., for a duration of time) may cause generation of an event by the endpoint. Various processes and/or hardware on an endpoint may generate events. The endpoint may detect the event from the processes and/or hardware. The endpoint may transmit the event to a server (e.g., one or more of servers 144). In some embodiments, the server (e.g., implementing an activity manager module) receives events generated by an endpoint (e.g., based on the server implementing a callback routine related to events such as an event handler or event listener routine). When the server receives the events from one or more endpoint, the server may analyze the events against a metric(s) to determine a status for each of the one or more endpoints (and/or user identifier associated with each). The teachings of the present disclosure are not limited to cases where endpoints (and processes and/or hardware on the endpoint) generate the events. For example, a server may receive data from the endpoint and may generate events related to the endpoint (based on receipt or lack of receipt of data from the endpoint).

An endpoint may be utilized as a proxy for a user that is operating the endpoint. It is noted that throughout the present disclosure, the terms "user" and "participant" are used interchangeably. Both terms include a user that can utilize an endpoint to connect to a virtual meeting; within the virtual meeting, one or more identifiers are used to identify the user. The user may be associated with endpoint by storing an association between the endpoint and the user (e.g., using identifiers for each of the endpoint and the user). An identifier for an endpoint (i.e., an endpoint identifier) may include a MAC address, a phone number, a serial number, a token stored on the endpoint, and/or any other data (e.g., string, number, bits) that is suitable to identify an endpoint. An identifier for a user (i.e., a user identifier) may include an email address, a name, an office number, a title, a job description, a numerical ID, a text string, employee ID, and/or any other data to identify a user (e.g., a participant in a virtual meeting). In some examples, storing an association between the endpoint and the user includes storing an identifier of the endpoint and a correspondence to an identifier of the user (e.g., linked together in a database). Events generated by the endpoint may be attributed to the user. Thus, the events may be analyzed to determine a measure of attentiveness (e.g., a status value) for the user.

A status includes a value (i.e., a status value) that may be used to relate activity received at an endpoint to attentiveness of a user associated with the endpoint. For example, attentiveness may relate to detection of events that may affect an endpoint's ability to access meeting content (e.g., video and/or audio data) and, therefore, may affect a user's ability to view and/or hear the content. A plurality of status values may be utilized to characterize various levels of attentiveness based on an analysis of events generated by an endpoint. The plurality of values may be discrete values or continuous values (e.g., in a range). For example, a status value may be one of a discrete number of enumerated values (e.g., (0 or 1); ("Inactive" or "active"); ("high", "moderate", or "low")). In other examples, a status value may be a continuous value in a range. In further examples, the plurality of values may be a set of, e.g., five values or 10 values. The status values may be stored in any suitable format based on the values (e.g., text format, a string such as "inactive" or "active", a Boolean, an integer, floating point value, etc.). In some examples, the status value may be an identifier that corresponds to a particular definition of a status value (e.g., a number that corresponds to a definition provided in plain text).

A metric encompasses characteristics or behavior of an inattentive (and/or attentive) user based on events generated by an endpoint. A metric may be used to determine a status value. For example, a server (e.g., one or more of servers 144) and/or a virtual meeting module may utilize a metric to determine which of a plurality of status values to assign to a user identifier and/or endpoint identifier. In some embodiments, a metric includes a function for determining a status value. Such a function may be used to process and or analyze events. For example, the function may accept one or more events as input (and/or corresponding timestamps) and output a status value. In further examples, the function may output further information regarding (e.g., characterizing or classifying) the status value that was output (e.g., a classification of the status value, an identifier for a metric used to determine the status, a reason for a status value being assigned, and/or a textual description). For example, a metric may be stored with a textual description identifying a reason for outputting status value (e.g., a single metric may contain multiple classifications based on the particular status value that is output). If the output status value is "inactive," a first classification may be provided; if the output status value "active," a second classification may be provided. In some examples, the classification is utilized to generate graphical output (e.g., utilized to generate a window including a textual representation of the classification). The implementation of the function may utilize attributes of the event to perform comparisons or calculations based on the attributes. The attributes of the event may include, e.g., a timestamp of the event, relative timing of a plurality of events (including the event), a sequence of receipt of a plurality of events, a type of event, a source of the event, a time since a last event, and/or a combination thereof. In operation, a metric may be used to periodically analyze events (e.g., at regular time intervals) and/or to immediately analyze events (e.g., upon detection of the events). Some examples presented in the present disclosure relate to utilizing metrics to detect (and/or characterize) inattentiveness of a user. The teachings herein are not limited to such examples and are equally applicable to detecting attentiveness of a user.

The following are (non-limiting) exemplary metrics that may be utilized to determine a status based on one or more events: a network connectivity metric, a power metric, a communication metric, an engagement metric, a response metric, and an input metric. What follows is a description of each of the above exemplary metrics according to some embodiments of the present disclosure. In the discussion of each the below exemplary metrics, an endpoint may be executing a virtual meeting application and/or an activity manager module to connect to a virtual meeting session. The virtual meeting application and/or an activity manager module may detect events on the endpoint for transmission to a server (e.g., one or more of servers 144). The endpoint may transmit the events to the server. The server may receive the events from the endpoint. The server may record a timestamp corresponding to a time at which each event is received. The server may analyze the events based on the exemplary metrics to determine (and/or generate) a status value for association with an identifier for a user or the endpoint (e.g., user identifier and/or endpoint identifier).

A network connectivity metric may be utilized to determine whether an endpoint is connected to or is disconnected from a network connection. A network connectivity metric may be utilized to analyze, among other things, one or more connection status events. A connection status event may be a "ping", or any other data related to network reachability that is transmitted at a regular frequency. An endpoint may transmit, to a server (e.g., one or more of servers 144), a connection status event at regular intervals. Thus, the server may receive a connection status event from the endpoint at regular intervals. The network connectivity metric may be a function that operates on a timestamp associated with the connection status event. The function may compare a timestamp associated a most recent connection status event to a current time. A difference in time (or a derivative thereof, such as number of missed events) between the timestamp and the current time may be compared to a threshold. The threshold may be an absolute value or a multiple of an expected time interval between connection status events (e.g., five pings). In a particular example, if the difference in time is greater than or equal to the threshold then the metric provides for (or generates) an output of inactive status. If the time difference is less than the threshold, then the metric provides for (or generates) an output of active status. In this particular example of a network connectivity metric, a server determines a status value based on an amount of elapsed time since a last network connection status was received from the endpoint.

A power metric may be utilized to determine whether an endpoint has lost power and/or whether the endpoint has disconnected from a virtual meeting based on loss of power. A power metric may be utilized to analyze, among other things, one or more power events. A power event includes data indicative of an amount of power (e.g., an amount of energy, time etc.) available to the endpoint. Such a metric may be utilized to analyze data generated by any endpoint that utilizes a power source. In some embodiments, a mobile endpoint (e.g., smart phone, laptop, or any endpoint accessing power from mobile power source, such as a battery) may utilize such a metric and/or be analyzed against such a metric. Power events may be sent periodically, intermittently, and/or only when a threshold value has been detected. For example, an endpoint may transmit a power event to a server (e.g., one or more of servers 144) when remaining power has reached a threshold (e.g., critically low level). The threshold may be determined based on a percentage of battery life remaining, an estimated remaining time of use for the battery, and/or any combination thereof. In a particular example, the endpoint may transmit a power-off event (e.g., when estimated remaining time is less than 1 minute). A power metric based on this particular power event may instruct that when the power-off event is received, the output is a status value of "inactive" (e.g., and is associated with an endpoint identifier corresponding to the endpoint from which the event was received). A power event may explicitly include a value identifying an amount of power. In such a case, the server receives (contained within the power event) the value identifying the amount of power. One implementation of a power metric may compare the value identifying the amount of power to a threshold. In some cases, if the power is above the threshold, the output may be a status value of "active"; if the power is at or below the threshold, the output may be a status value of "inactive". Such a metric may be utilized to determine whether a user associated with the endpoint is inattentive based on, e.g., a preoccupation with assessing the power supply of the endpoint and/or coupling the endpoint to a power supply.

In another exemplary implementation of a power metric, a power event is used in combination with a connection status event and/or a network connectivity metric. In such an example, the power metric may require that after the server receives a power event (e.g., where power is below a threshold) from an endpoint, the server will analyze a connection status event for the endpoint. If a network connectivity metric applied to the connection status event results in output of a status value of "inactive" (i.e., the user endpoint has lost network connectivity), then it may be determined (e.g., by the servers) that the endpoint lost network connectivity due to loss of power. A metric may be utilized to determine a status value based on a sequence in which one or more events are received and/or a sequence in which one or more other metrics are satisfied. In this example, the metric (and/or the servers) utilizes the sequence of the power event and the network connectivity event (i.e., network connectivity metric requires that the power event precede the detection of loss of connectivity). A metric may be determined based on a relative timing in which one or more events is received and/or one or more other metrics are satisfied. In such an example, if a duration of time between a power event and detection of loss of connectivity is within a certain threshold, a status value of "inactive" may be output (e.g., else status value of "active" may be output). In this example, after a status value of "inactive" is associated with an endpoint, the endpoint may regain a status value of "active" (e.g., by reconnecting to the network and/or to the virtual meeting via the network).

A communication metric may be utilized to determine whether an endpoint is receiving and/or generating a response to a communication (e.g., outside of a virtual meting client). For example, a communication may include an email, a phone call, a text message, an instant message, and/or any other communication that may be received by an endpoint. A communication metric may be utilized to analyze, among other things, one or more events related to such a communication. Such events may identify that the endpoint received a communication, identify that the endpoint initiated a reply to the communication, identify that the endpoint completed a reply to the communication, and the like. For example, identifying that the endpoint received the communication may include any event generated upon receipt of any of the above exemplary communications. An event identifying that the endpoint initiated a reply to the communication may include an event generated when: an endpoint uses an email client application to initiate generating an email response (e.g., initiate reply) to a received email (e.g., such an event may be generated upon the endpoint receiving a selection of the reply button and email client); an endpoint receives an input at a reply button in a text message application or instant message application; an endpoint answers a call (e.g., upon the endpoint receiving a user input to answer the received call). An event identifying that the endpoint completed a reply to the communication may include an event generated when an endpoint receives an input effective to end a call, send an email, send a text message, send an instant message, or complete any other communication that may take a duration of time to generate (or complete). In a particular example, a communication metric may specify an output of "inactive" status upon detecting receipt of a communication. In one example, an endpoint may return to "active" based on receipt of an event related to declining to read (or reply to) the communication or disappearance of a notification related to the communication. The endpoint may return to "active" based on other metrics as well.

It is noted that, in some examples, an endpoint may receive a rapid succession of communications. For example, in instant messaging or text messaging, multiple messages may be received in a (relatively short) period of time. Likewise, responses to the communications may be generated transmitted in a (relatively short) period of time. In such examples, the server may receive a plurality of events in a (relatively short) period of time. The server may group the plurality of events into a single block of time identified as inactive status as opposed to generating several rapid transitions from "inactive" status to "active" status (e.g., the block of time containing all time at which each of the plurality of events is received).

A response metric may be utilized to determine whether an endpoint is responsive to one or more communications in a virtual meeting session. In some examples, a server may detect whether a particular endpoint is responsive to communications (within the virtual meeting) that are directed to the particular endpoint. For example, because the virtual meeting session may include a plurality of endpoints (each associated with a user), a first endpoint in the virtual meeting may transmit (via the virtual meeting session) a message to a second endpoint in the virtual meeting. Because the server may be involved in transmitting the message from the first endpoint to the second endpoint, the server can identify both endpoints involved in the communication. The server may detect an event generated by the first endpoint upon generating the message. The server may detect an event generated by the second endpoint upon receiving the message. An exemplary response metric may be utilized to determine (e.g., by the server) the amount of time that it takes the second endpoint to respond to a communication (e.g., the message) from the first endpoint (e.g., based on the time at which the first endpoint sent the communication, the time in which the second endpoint receives the indication, and/or the events generated by the endpoints). The metric may include a function that compares the amount of time to a threshold. If it is determined that the amount of time exceeds or meets a threshold, the function may output a status value of "inactive". If it is determined that the amount of time is less than the threshold, the function may output a status value of "active". Response metrics may be applied to text communications (e.g., such as instant messages, SMS messages, etc.), audio communications (e.g., using voice recognition engine and/or speech-to-text engines), or any other communications transmitted between endpoints in a virtual meeting session.

An engagement metric may be utilized to determine whether an input is received at an endpoint. An engagement metric may be utilized to analyze, among other things, one or more input events. Any device coupled to the endpoint may generate an input event. An input event includes data indicative of receiving input from an input device. Exemplary input events include a click event, a mouse movement event, left-click event, right-click event, button press event, button release event, click up, changed pixels event, or any other event that is generated by an input device. Some events may relate to an input being processed. For example, a digital camera may process an input image and generate events that identify a number of changed pixels, facial detection, gaze detection, user movement, and the like. An engagement metric may also relate to whether an endpoint has received an input with a threshold period of time. For example, such a metric may include a function that calculates a time difference between a current time and a time corresponding to a last input event (e.g., a most recent mouse input event, or last facial detection event generated based on detection of a particular user's face in an input image). If the time difference is greater than or equal to a threshold, the function may output a status value of "inactive" (e.g., else output "active" status). Input events may be transmitted from the endpoint to a server (e.g., one or more of servers 144). The server receives the input events from the endpoint. Some events may affect an endpoint's ability to generate visual and/or audio communication data to a virtual meeting. For example, an endpoint may detect an event from a monitor when the monitor is powered off (i.e., where the monitor is coupled to the endpoint). Because the monitor is powered off, the endpoint may be unable to generate graphical data and/or unable to cause the monitor to display the graphical data. Thus, some metrics may utilize detection of such an event (e.g. powering on/off of display hardware, audio output hardware, etc.) to output a status value for the endpoint. For example, when an event indicating powering off of a visual output device (or an audio output device) is detected, the metric may specify an output of "inactive" status for the endpoint. Likewise, when an event indicating powering on of a visual output device (or an audio output device) is detected, the metric may specify an output of "active" status for the endpoint. A similar process may occur when a screensaver is detected on a monitor connected to an endpoint (e.g., such an event may be treated in a manner similar to that described for powering off of a monitor).

A metric may be utilized to generate a status value for a user identifier (e.g., a single user) based on a plurality of endpoints associated with the user identifier (e.g., the plurality of endpoints being associated with the single user). In a particular example, a user connects to an audio portion of a virtual meeting session using a mobile endpoint. The same user may connect to a video portion of the virtual meeting session using a different endpoint. Both the mobile endpoint and the different endpoint may be associated with a single user identifier. If the mobile endpoint loses a connection to the audio portion of the virtual meeting session (e.g., due to dropping a cellular connection), the different endpoint may generate an event indicating loss of audio output capability (e.g., based on detecting that the audio device associated with the user has lost audio capacity in the virtual meeting). In this particular example, an engagement metric may be used to correlate different endpoints connected to the virtual meeting with a single user and to detect absence or presence of the endpoints in the virtual meeting. Thus, a server may detect an event indicating that one of the endpoints (associated with the single user) has exited the virtual meeting session and may correlate the endpoint with a type (e.g. audio, video). An engagement metric may specify that upon detecting that one endpoint of a plurality of endpoints associated with a single user has exited the virtual meeting, the user (via a user identifier) be associated with an inactive status. Other exemplary engagement metrics relate to assessing whether input is received at a particular input device (e.g., whether input is received at a mouse and/or keyboard in a threshold period of time), content detected by an input device (e.g., a camera detects no person in an image captured by the camera), a state of an output device, content detected by an output device (e.g., whether the virtual meeting application is a front window displayed on a monitor, i.e., not hidden behind another window).

Other inputs may relate to events generated by an endpoint that directly correspond to a status value. For example, an endpoint may transmit a status value directly to a server (e.g., one or more of servers 144). For example, an endpoint may include input components that are operable to set a status value and/or to toggle from a current status value an alternate status value. For example, a hardware button and/or a user interface button may be used to toggle a status value from inactive status to active status. For example, such an interface component may be utilized in cases where a user believes that their current status is incorrect. In other cases, a similar user interface but may be used to toggle from active status to inactive status. Such an application may be useful for example when a user needs to take a break and anticipates that they will miss content in the virtual meeting.

Figure 2:
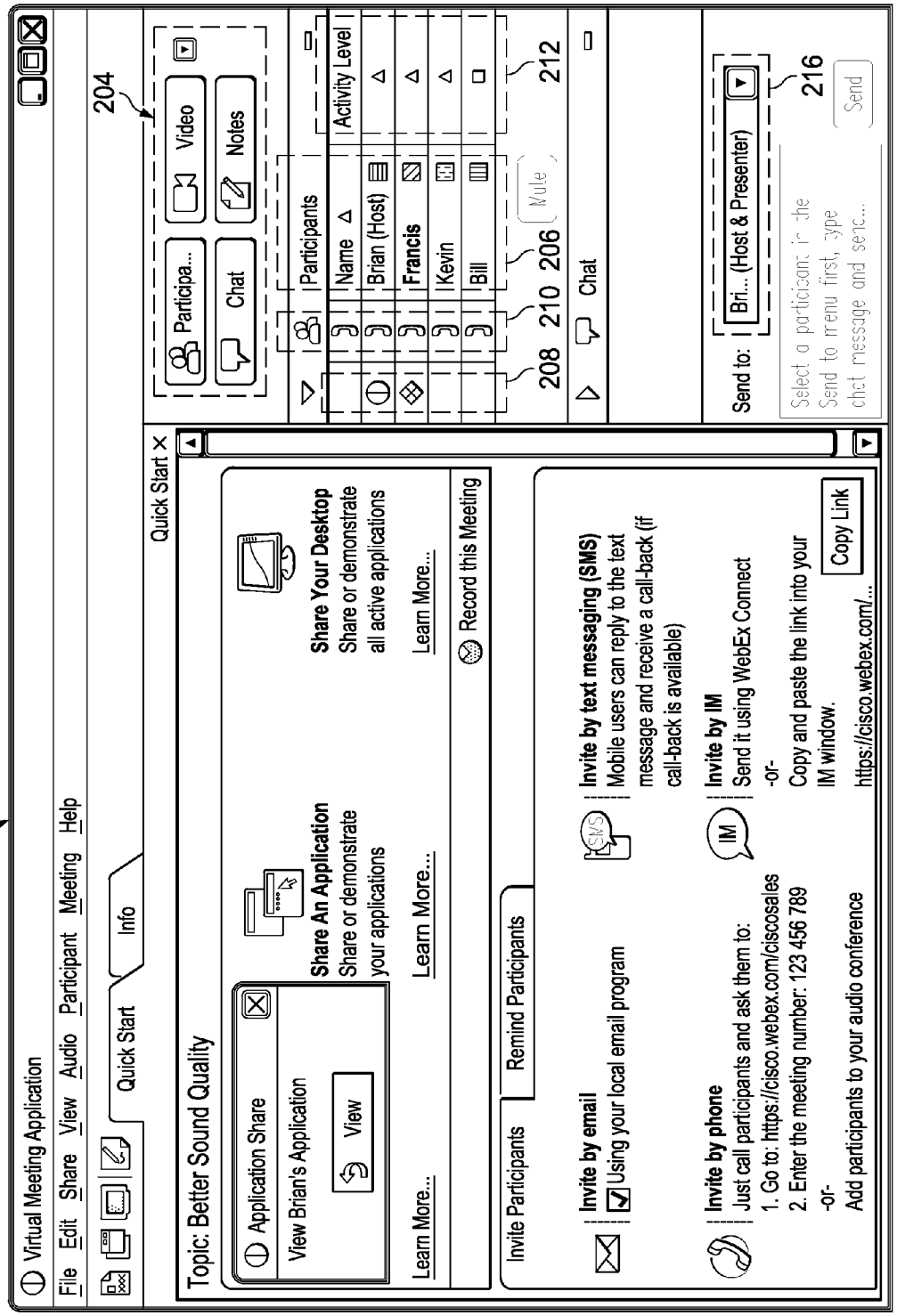
FIGS. 2, 3A, and 3B are simplified schematic diagrams illustrating example user interface graphics associated with possible implementations of the communication system.

The metrics described above (and/or other metrics) can be utilized in a system for managing activity in a virtual meeting session. A plurality of endpoints may be connected to the virtual meeting session. Each endpoint may implement (and execute) a virtual meeting application. Turning to FIG. 2, FIG. 2 illustrates an exemplary user interface (window 200) for a virtual meeting application running on an endpoint involved in a virtual meeting session. This example corresponds to a window 200 that is displayed on an endpoint associated with a user identified as "Francis" (e.g., displayed immediately after Francis joins the meeting). Window 200 includes, among other things, user interface components 204, 206, 208, 210, 212, and 216.

The component 204 includes user interface buttons labeled "Participa . . . " (i.e., abbreviated from "Participants"), "Video", "Chat", and "Notes". Each of the buttons is effective to execute or display an additional user interface component for the associate respectively. The user interface button labeled "Participa . . . " is operable to display a list of participants. The user interface button labeled "Video" is operable to display video associated with one or more of the participants. The user interface button labeled "Chat" is operable to display video a chat interface for the virtual meeting. The user interface button labeled "Notes" is operable to display notes for the virtual meeting.

The component 206 includes a list of user identifiers corresponding to users that are connected to the virtual meeting (i.e., the "Participants" as labeled in 206 FIG. 2). In this case, each user identifier is a name (i.e., a text string). Each participant may input (e.g., via a virtual meeting application) a user identifier upon initiating joining the virtual meeting session. The identifiers may also correspond to an endpoint associated with each participant (e.g., operated by or belonging to each participant). The endpoint receives (via the virtual meeting application) the user identifier and may transmit the user identifier to the server. The server stores the user identifier with an association to an endpoint identifier of the endpoint from which the user identifier is received.

The component 210 includes a list of telephone icons corresponding to the list of user identifiers. The presence of a telephone icon that corresponds to a particular user identifier indicates that the user (identified by the particular user identifier) is connected to an audio stream of to the virtual meeting session. In the example of FIG. 2, all of the participants are connected (by one or more endpoints) to the audio stream.

The component 208 includes a list of other icons corresponding to the list of user identifiers. Each of the other icons corresponds to additional information for a user. In this case, a ball icon is shown associated with user identifier "Brian" (also labeled as the "Host" of the meeting). The ball icon indicates that the corresponding user (Brian) is an active presenter and, therefore, has control over data transmitted to other users in the meeting (e.g., applications, a desktop, a document, and the like). For example, the active presenter can freely share his desktop such that other meeting participants can observe information that is resident on his local machine. A diamond icon is shown associated with user identifier "Francis". The diamond icon indicates that the current window 200 is executing on an endpoint corresponding to the user Francis (e.g., so that a user may identify themselves in the list of participants). In this case, window 200 corresponds to a virtual application running on endpoint associated with the user Francis.

The component 212 is a list of activity status icons corresponding to the list of user identifiers. Each of the activity status icons indicates a status value for a corresponding to user identifier (and therefore each corresponding user). In this case, a triangle activity status icon corresponds to a status value of "active" and a square activity status icon corresponds to a status value of "inactive". An activity status icon is provided for each of the users present in the virtual meeting (e.g., based on the user identifier). In this example, Brian is currently associated with a triangular activity status icon, which identifies that his current status is "active"; Francis is currently associated with a triangular activity status icon, which identifies that his current status is "active"; Kevin is currently associated with a triangular activity status icon, which identifies that his current status is "active"; and Bill is currently associated with a square activity status icon, which identifies that his current status is "inactive".

The component 216 is a list of participants with which to communicate by chat within the virtual meeting session. The list allows selection of a user identifier of another user with whom to send a communication inside of the virtual meeting session. In operation, the component 216 may be used to direct communications to an individual endpoint (e.g., identified based on selecting a single identifier) or to broadcast communications to all participants in the meeting (e.g., based on selecting an identifier corresponding to broadcasting a message to all users in the meeting). The component 216 generates events. In operation, a metric (e.g., a response metric or any other metric) may utilize events generated by component 216 and/or a chat window in which component 216 is located. A user may utilize any of the components 204, 206, 208, 210, 212, 216 and/or any other user interface components (which may also generate events) shown in window 200 to interact with other users in the meeting.

Figure 3A:
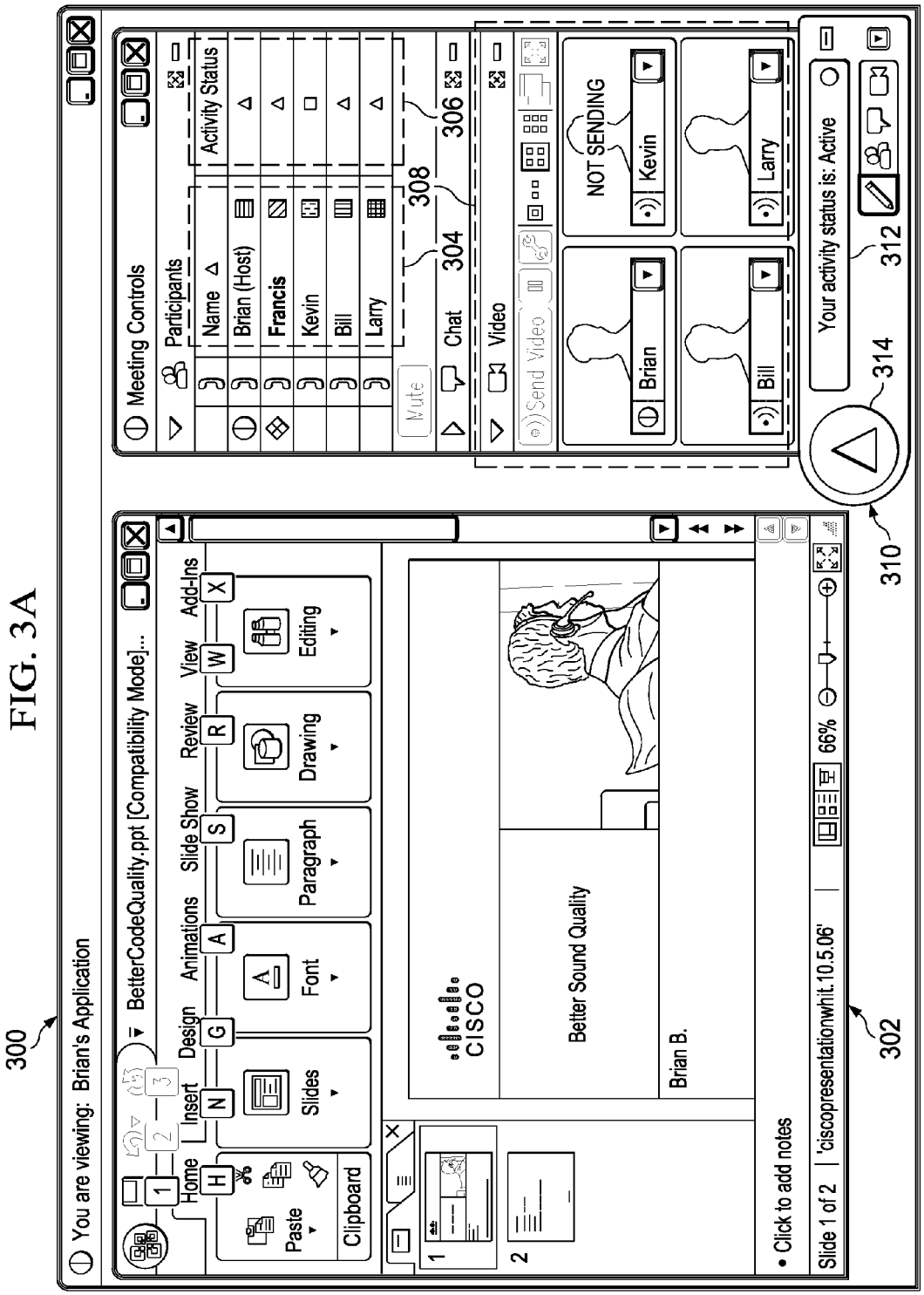

At a subsequent point in time after the display of window 200, an endpoint associated with the user Francis may display window 300 (as illustrated in FIG. 3A). Turning to FIG. 3A, FIG. 3A illustrates an exemplary user interface (window 300) for a virtual meeting application running on an endpoint involved in a virtual meeting session. Window 300 includes, among other things, interface components 302, 304, 306, 308, 310, 312, and 314.

The interface component 302 includes a video stream associated with content that is shared by the active presenter in the virtual meeting session. In this example, the video stream includes a slideshow application shared by the user Brian. For example, an endpoint associated with the user Brian may be transmitting data from his slideshow application to a server (e.g., in data center meeting zone 140) associated with the virtual meeting session for transmission as the video stream. The server may transmit or broadcast the video stream to each of the endpoints connected to the virtual meeting session. Thus, in this example, each of the endpoints receives the video stream.

The interface component 304 includes a list of user identifiers similar to the list described with respect to component 206 in FIG. 2. The list in component 304 includes each of the user identifiers that were present in the list in component 206. However, in addition to those users present before, a user identified as "Larry" has join the meeting and a corresponding user identifier is included in the list in component 304.

The interface component 306 includes list of activity status icons similar to the list described with respect to component 212 in FIG. 2. The list in component 306 includes an updated version of the list from component 212. In this example, Brian is currently associated with a triangular activity status icon, which identifies that his current status is "active"; Francis is currently associated with a triangular activity status icon, which identifies that his current status is "active"; Kevin currently associated with a square activity status icon, which identifies that his current status is "inactive"; Bill is currently associated with a triangular activity status icon, which identifies that his current status is "active"; Larry (a new addition to the meeting) is currently associated with a triangular activity status icon, which identifies that his current status is "active". The statuses associated with Brian and Francis remain unchanged in window 300 in FIG. 3 relative to window 200 in FIG. 2; Kevin's status was updated from active to inactive; Bill's status was updated from inactive to active; Larry was not initially present when window 200 generated. Thus, Larry's status may have also changed from an inactive (e.g., based at least on initially being absent) to active.

The interface component 308 includes video chat data for the users Brian, Kevin, Bill, and Larry. Each of Brian, Bill, and Larry are sharing video chat data with Francis (and/or other participants in the virtual meeting session). Kevin is not sharing video chat data with Francis (and may or may not be sharing video chat data with another user or users in the virtual meeting session).

The component 310 includes user interface components 312 and 314. The component 312 is a user interface button that includes the text, "Your activity status is: Active". The component 314 is a user interface button that includes an icon that matches an activity status icon used in lists 306 (FIG. 3) and 212 (FIG. 2). In this case, the icon is a triangle icon, which corresponds to a status value of "active". Indicia in 310 (i.e., in 312 and 314) indicate that the user Francis is currently associated with a status value of "active". The status provided in 310 may be generated (e.g., by a server and/or activity manager module) based on events generated by the endpoint Francis is using to execute the virtual meeting application. The components 312 and/or 314 may be responsive to input (e.g., selection, click, etc.). For example, component 312 and/or 314 may be operable to toggle a status from a current value to an alternate value. When an input is received at component 312 and/or 314 a status value may be transmitted from the endpoint to a server and/or virtual meeting manager. In this example, selecting 314 may cause the endpoint to transmit an alternate value of "inactive" to the server and/or virtual meeting manager.

Figure 3B:
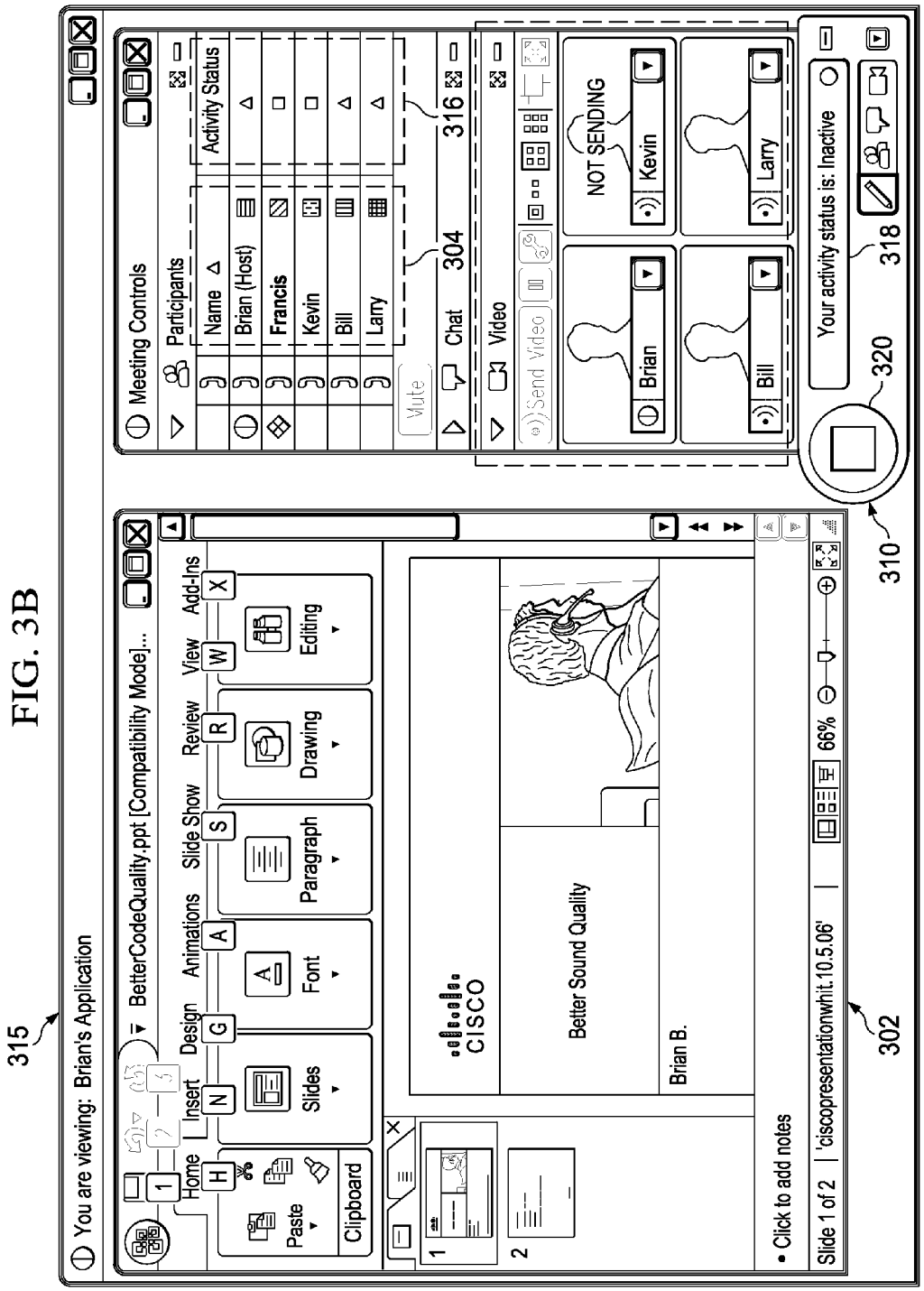

At a subsequent point in time after the display of window 300, an endpoint associated with the user Francis may display window 315 (as illustrated in FIG. 3B). Turning to FIG. 3B, FIG. 3B illustrates an exemplary user interface (window 315) for a virtual meeting application running on an endpoint involved in a virtual meeting session. Window 315 includes, among other things, interface components 302, 304, 316, 310, 318, and 320. Window 315 includes components similar to those described with respect to windows 200 (FIG. 2) and 300 (FIG. 3A). The list in component 304 remains unchanged from window 300 to window 315. Window 315 illustrates that although the list of participants has not changed, a status associated with some of the users has changed. For example, the list in component 316 includes an updated version of the list from component 306. In this example, Brian is currently associated with a triangular activity status icon, which identifies that his current status is "active"; Francis is currently associated with a square activity status icon, which identifies that his current status is "inactive"; Kevin currently associated with a square activity status icon, which identifies that his current status is "inactive"; Bill is currently associated with a triangular activity status icon, which identifies that his current status is "active"; Larry is currently associated with a triangular activity status icon, which identifies that his current status is "active". The status associated with all of the users, except Francis, remains unchanged relative window 300 in FIG. 3A; Francis' status was updated from active to inactive. For example, Francis may have been determined to have a status of "inactive" due to a failure to respond to question directed to him in the virtual meeting (e.g., a question transmitted to Francis using video chat 308, an audio stream for the virtual meeting session, a text "Chat" in the virtual meeting session, and the like). The status may be determined using a metric as described herein. The interface components 318 and 320 correspond to interface components 312 and 314, respectively. The user Francis' status has a current value of "inactive". When an input is received at component 320 (or 318), the endpoint may transmit an alternate value of "active" to the server and/or virtual meeting manager.

Figure 4:
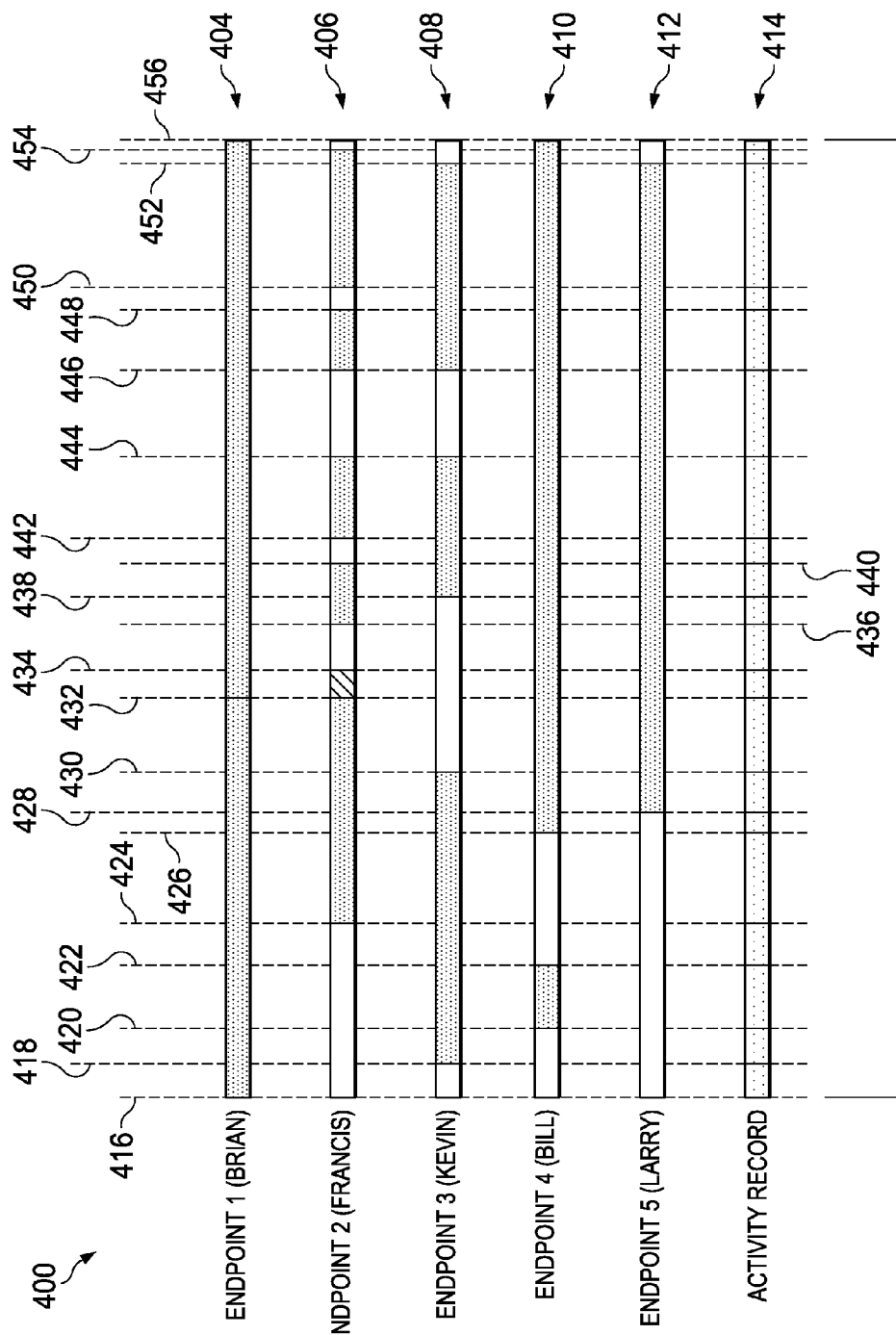
FIG. 4 is a simplified diagram illustrating status values at various times for endpoints (and users) in a virtual meeting session according to some embodiments of the present disclosure.

FIG. 4 is a simplified diagram (diagram 400) illustrating status values (for endpoints and/or users) at various times in a virtual meeting session. Diagram 400 includes time points 416-456 and a number of timelines 404, 406, 408, 410, 412, and 414 that corresponds to the time points (e.g., times). Each of the dashed vertical lines corresponds to a time (e.g., one of the time points 416-456) in the virtual meeting session. The times 416-456 are organized sequentially from left to right. When read from left to right, the times illustrate a sequence of events for endpoints 1-5, which are connected to the virtual meeting session. Regions filled white (i.e., no hatching) in the timelines 404-412 correspond to a first status value. Regions filled with a dotted hatch in the timelines 404-412 correspond to a second status value. Regions filled with a diagonal line hatch in the timelines 404-412 correspond to periods of time that are assigned the first value while the meeting is in progress and are retroactively assigned the second value after the meeting has ended. In this example, the regions filled white correspond to periods of time where an endpoint is inactive; the regions filled with the dotted hatch correspond to periods of time where an endpoint is active. In other examples, the regions filled white may correspond to active; the regions filled with the dotted hatch may correspond to inactive. Other status values or numbers of status values may be used. The virtual meeting session begins at time 416 and ends at times 456. Timelines 404, 406, 408, 410, and 412 each indicate status values during various periods during the virtual meeting session. Timelines 404, 406, 408, 410, and 412 correspond to endpoint 1 (Brian), endpoint 2 (Francis), endpoint 3 (Kevin), endpoint 4 (Bill), and endpoint 5 (Larry) respectively. Each endpoint may be associated with a user identifier (and/or user). Endpoint 1 is associated with a user identifier "Brian" (e.g., for a user named Brian). Endpoint 2 is associated with a user identifier "Francis". Endpoint 3 is associated with a user identifier "Kevin". Endpoint 4 is associated with a user identifier "Bill". Endpoint 5 is associated with a user identifier "Larry". Each of endpoints 1-5 is connected to the virtual meeting session. Note that the windows described with respect to FIGS. 2, 3A, and 3B correspond to times in diagram 400. The timeline 414 is an activity record that stores data associated with events (e.g., events, metrics, statuses, timestamps, metadata, and the like) at different points in time during the virtual meeting session (e.g., times 416-456).

The activity record 414 is updated by one or more servers (e.g., servers 144 in data center 140) at each of times 416-456 based on receipt of events from any one or more of the endpoints 1-5 (as indicated on the timelines 404, 406, 408, 410, and 412). When an event is generated by an endpoint, the event may be transmitted by the endpoint to the one or more servers (e.g., based on which events the one or more servers are registered to receive using a call back routine or event handle). The one or more servers receive the events from the endpoint (or endpoints). The one or more servers analyze the events (e.g., using metrics) to determine a status value to associate with the endpoint upon receipt of the events. In some examples, the one or more servers implement at least a portion of logic 1200 (FIG. 12) to process events received during the virtual meeting session. In the example of diagram 400, the one or more servers output (and/or store) the status values as indicated in the timelines 404-412. The one or more servers store information related to the received events (e.g., user identifier, endpoint identifier, timestamp at which the event is received, type of event, status values for an endpoint, timestamp stamps for a status value of an endpoint, metadata for the event, and/or any other data) in the activity record 414. What follows is a discussion of each time in the times 416-456.

At time 416, endpoint 1 (user identifier "Brian") initializes the virtual meeting and, thereby, establishes the virtual meeting session. Initiation of the virtual meeting session causes an event to be transmitted from the endpoint 1 to the one or more servers. The servers may record in the event in activity record 414 and assign active status to endpoint 1. At time 416, Brian is the only participant in the virtual meeting (i.e., the endpoint 1 is the only endpoint connected to the virtual meeting session).

At time 418, endpoint 3 (e.g., the user Kevin) connects to the virtual meeting session. Upon joining the meeting, the endpoint 3 may generate an event associated with joining the virtual meeting session and transmit the event to the servers for recording in the activity record 414. The servers assign active status to endpoint 3. At time 420, endpoint 4 (e.g., the user Bill) connects to the virtual meeting session. In this example, endpoint 4 is a mobile endpoint. Upon joining the meeting, the endpoint 4 may generate an event associated with joining the virtual meeting session and transmit to the servers for recording in the activity record 414. Subsequent to time 420 (and before time 422), endpoint 4 may experience a critically low battery (e.g., current battery level of 2% or less and/or 3 minutes of battery usage time economy). Endpoint 4 transmits an event to the server to indicate that the battery power is critically low and/or a power off. The endpoint 4 may then transmit a final connection status event to the servers before losing network connectivity.

At time 422, the servers may detect that three connectivity events (or "pings") have been missed from endpoint 4 (e.g., based on a metric and/or based on approximately 30 seconds expected between events and that 97 seconds have elapsed since the last event was received). A power metric may be utilized to determine at time 422, that the endpoint for lost network connectivity due to loss of power. In particular, the power loss metric may be applied to determine that the battery value 2% (i.e., received in the event from endpoint 4) is less than a threshold value of 5%, and may also determine that the number of missed connection events is three, which is greater than a threshold amount of two connection events. Based on analysis using the power metric, the endpoint 4 is associated with an inactive status in the meeting (and/or in record 414) beginning at time 422. The endpoint 4 may also be assigned a classification indicating that the endpoint lost connectivity due to loss of power.

At time 424, endpoint 2 (e.g., the user Francis) connects to the virtual meeting session. As described above for endpoint 3 joining the virtual meeting, the server may receive an event from endpoint 2 and assign (e.g., based on receipt of the event) active status to the endpoint 2. It is noted that window 200 (FIG. 2) is an example of a virtual meeting application window that may be generated for display on endpoint 2 between times 424 and 426.

At time 426, endpoint 4 regains to network connectivity and begins transmitting connection status events. The servers receive the events from endpoint 4. Based on a metric (e.g., a network connectivity metric or any other metric), the servers may determine that a time difference between a last ping and a current time is less than a threshold and, therefore, update the status for endpoint 4 from inactive to active. Throughout the remaining duration of the virtual meeting session, endpoint 4 does not generate any other events that caused its status to be changed.

At time 428, endpoint 5 (e.g., the user Larry) connects to the virtual meeting session. Upon joining the meeting, the endpoint 5 may generate an event associated with joining the virtual meeting session and transmit the event to the servers for recording in the activity record 414. The servers assign (at time 428) active status to endpoint 5.

Between times 428 and 430, the endpoint 3 receives a call (e.g., a phone call). Upon receiving input to answer the call, the endpoint may generate an event identifying that a communication is being generated outside of the virtual meeting application. The endpoint may transmit the event to the servers. At time 430, the servers receive the event and analyze the event based on a metric (e.g., a communication metric or any other metric). The servers may determine a status of inactive based on the analysis. Thus, the status associated with endpoint 3 is updated from active to inactive. The endpoint 3 may also be assigned a classification indicating that the endpoint was responding to another communication (i.e., an incoming call). It is noted that window 300 (FIG. 3A) is an example of a virtual meeting application window that may be generated for display on endpoint 2 between times 430 and 432.

At time 432, endpoint 1 generates and transmits an audio communication via the virtual meeting session. For example, the user Brian may speak the following question into a microphone coupled to endpoint 1, "Francis, can you write that down as an action item?" The endpoint 1 receives the audio communication from the microphone. The endpoint 1 transmits the audio communication to the servers. Upon receiving the audio communication, the servers may utilize a speech-to-text engine to generate a text output corresponding to the audio communication. The servers may then compare the user identifiers associated with each of endpoints 1-5 to the text output. Based on the comparison, the server determines that the user identifier associated with endpoint 2 (i.e., text "Francis") is included in the text. To distinguish between any mention of the user identifier (e.g., a comment such as "I met with James yesterday; we had fun.") the text output may be further analyzed to determine whether the user identifier is mentioned in the context of a question. Using such an analysis, mere mention of a user identifier (i.e., outside the context of a question) may not require a response and, therefore, would not result in the user being labeled inactive if no response is received from the endpoint. Using such an analysis, a mention of a user identifier in the context of a question may require a response (and therefore results in the user identifier being associated with an inactive status if no response is received from the endpoint). The servers identify that the text includes a question mark at the end of a sentence in which the identifier "Francis" is detected. Thus, the servers identify that the audio communication included a question that was directed to endpoint 2 (i.e., even though the audio communication was broadcast to all endpoints in the virtual meeting session). In the duration between receiving time 432 and 434, the server may analyze the question against a responsive metric to determine whether the endpoint 2 has responded. For example, the servers determine a time difference between when the audio communication was received and a threshold for receiving a response to the question in the communication.

At time 434, the servers may determine that a time difference (e.g., 2 minutes and 5 seconds) between the time when the audio communication was transmitted to endpoint 3 (i.e. at time 432) and a current time (i.e., time 434) is greater than the threshold for responding to a message (e.g., based on a metric). In this example, the threshold may be 120 seconds, and the time difference may be 125 second (i.e., the 2 minutes and 5 seconds). Thus, the servers determine that the time difference is greater than or equal to the threshold and update (at time 434) the status for endpoint 2 from active to inactive (and/or assigned a classification indicating that the user was unresponsive).

During the virtual meeting (i.e., while the meeting session is in progress), the endpoint 2 remains associated with active status in the time period between times 432 and 434. However, after the meeting ends, the server may determine that if the user did not respond to the audio communication within a threshold period of time (e.g., by time 434) that the user should be (retroactively) labeled as inactive beginning at time at which the question is asked (i.e., at time 432). Thus, for a single time period, a status determined while a meeting is in progress may differ from a status determined after the meeting ends. Moreover, the status may be updated in the activity record after the meeting ends (and/or anytime after the initial determination is made).

Figure 5:
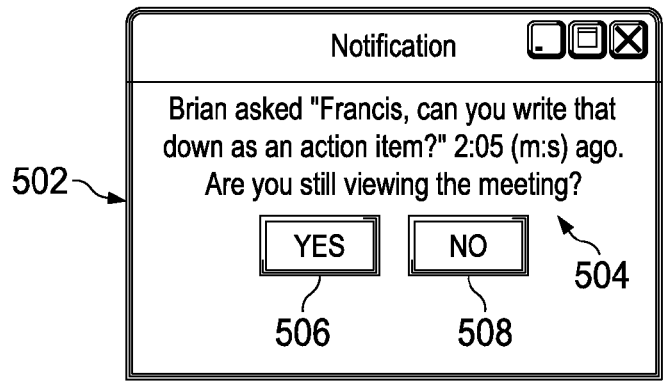
FIGS. 5, 6, 7A, 7B, 8A, 8B, 8C, 9, 10, 11A, and 11B are simplified schematic diagrams illustrating example user interface graphics associated with possible implementations of an output (or representation of a virtual meeting) according to some embodiments of the present disclosure.

It is noted that window 300 (FIG. 3B) is an example of a virtual meeting application window that may be generated for display on endpoint 2 in a time period between times 434 and 436. In this time period, the status value of inactive is associated with endpoint 2 (Francis) due to endpoint 2 being unresponsive to the question in the communication transmitted by endpoint 1 (i.e., the question asked by Brian). When the endpoint 2 is assigned the status value of inactive, the servers may generate a message for transmission to endpoint 2. For example, FIG. 5 illustrates an exemplary window (window 502) that may be generated (at least in part) by the servers. In some examples, the endpoint 2 may generate and/or render the window 502. The window 502 includes indicia 504 and interface buttons 506 and 508. The indicia 504 includes the text "Brian asked 'Francis, can you write that down as an action item?'" 2:05 min:sec ago. Are you still viewing the meeting?" The indicia 504 include at least a portion of the text output generated by the servers based on the audio communication from endpoint 1. Likewise, the indicia include output from a timer. The timer currently reads 2:05. The timer is generated to compare a current time with the time at which the audio communication was received from endpoint 1. Over time (e.g., while awaiting an input), the timer may continue to update the display based on the current time (e.g., increase from 2:05 to 2:06, then from 2:06 to 2:07, etc.). Receiving an input at interface button 506 is operable to identify that the endpoint is still active in the meeting. Such an input would result in the server updating the status associated with endpoint 2 from inactive to active (e.g., based on receiving an event from the button 506). Similarly, interface button 508 is effective to receive an input. Input at interface button 508 is operable to maintain the current status of "inactive". At time 436, the servers may receive an event from endpoint 2 based on an input received at interface button 506. When the event is received, the servers update the status associated with endpoint 2 from inactive to active.

At time 438, endpoint 3 transmits an event to the servers identifying that the previously answered telephone call was terminated on the endpoint. When the servers receive the event, the servers update the status of endpoint 3 from inactive to active based on a metric (e.g., a communication metric or any other metric).

At time 440, endpoint 2 generates an event identifying that a screensaver began displaying on a display coupled to the endpoint (e.g., a begin screensaver event). When the server receives the event from endpoint 2, it may be analyzed against a metric (e.g., an engagement metric or any other metric). In this case, the servers may look up the event in a table that contains correspondence between events and status indicators. For example, the table may include a correspondence between the event (e.g., the begin screensaver event) and an immediate action to apply inactive status to the endpoint. The servers may update, based on such a table, the status of endpoint 2 from active to inactive. Subsequently, the endpoint receives an input from a mouse moved event, which terminates the screensaver process. As a result, the endpoint 2 to transmits an event (e.g., a terminate screensaver event) to the servers.

At time 442, servers receive from endpoint 2 the event indicating that a screensaver was closed (or otherwise terminated). The servers may look up the event in a table that is similar to that described with respect to time 440. In this case, the table may include an entry containing a correspondence between the event and an immediate action to assign active status to the endpoint. As a result, the servers update the status value for endpoint 2 from inactive to active. The endpoint 2 may also be assigned a classification indicating that the endpoint was idle beginning at time 440 and ending at time 442.

Also at time 442, endpoints 2 and 3 transmit connection status events to the servers. However, at a time prior to time 444, both endpoints stop transmitting connection status events. In this example, endpoints 2 and 3 may be utilizing the same network access point. Consequently, both endpoints may lose network connectivity at approximately the same time due to problems with the access point. At time 444, the servers may determine that a time difference between a current time and the time of a last ping for each of endpoints 2 and 3 meets a network connectivity metric for outputting a status value of inactive. Thus, at time 444, the status value of each of endpoints 2 and 3 is updated, based on the network connectivity metric, from active to inactive. The endpoints 2 and 3 may also be assigned a classification indicating that the endpoints lost network connectivity. At time 446, each of endpoints 2 and 3 has regained network connectivity and has sent connection status events to the servers. Thus at time 446, the servers may analyze the connection status events against a metric to determine that the statuses of the endpoints 2 and 3 should be updated from inactive to active.

At time 448, the servers receive an event (e.g., a begin screensaver event) from endpoint 2. Consequently, a status associated with the endpoint 2 is updated (e.g., by the servers) from active to inactive by using a table in a manner that is similar to that described with respect to time 440. At time 550, the servers receive an event (e.g., a terminate screensaver event) from endpoint 2. A status associated with the endpoint 2 is updated (e.g., by the servers) from inactive to active by using a table in a manner that is similar to that described with respect to time 442.

At time 452, each of endpoint 3 and endpoint 5 terminate their virtual meeting application. Thus, each endpoint transmits, to the servers, an event identifying the termination of the virtual meeting application. The servers update the status for each of endpoint 3 and endpoint 5 from active status to inactive status. At time 454, endpoint 2 exits the virtual meeting session based on receiving an input (e.g., at a button in a virtual meeting application) to disconnect from the meeting session. As a result, the endpoint 2 transmits, to the server, an event identifying the disconnection from the meeting session. The server receives the (disconnection) event and determines a status value of inactive for the endpoint 2 (e.g., based on the metric related to engagement).

Finally, at time 456, the endpoint 1 terminates the virtual meeting session (e.g., ends the meeting). As a result, endpoint 1 may transmit, to the servers, an event identifying that the meeting session is terminated. Based on the event, the servers identify that both endpoint 1 (Brian) and endpoint 4 (Bill) were connected to the virtual meeting server at the time of the event and may determine (e.g., using a metric) that endpoints 1 and 4 have logged out at the end of the virtual meeting session. Endpoint 1 and endpoint 4 (and/or the corresponding user identifiers) are associated with an "active" status up to the end of the virtual meeting session (and/or recording thereof).

Figure 6:
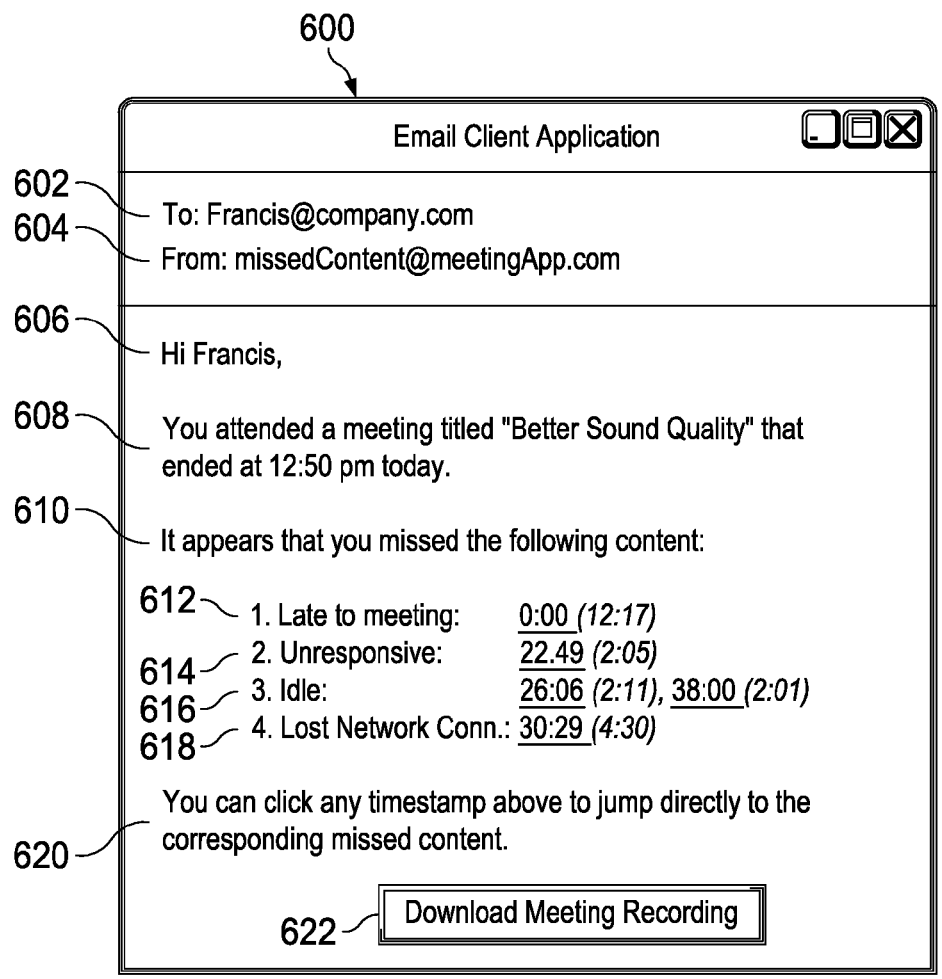

FIG. 6 illustrates an exemplary output generated based on a plurality of events in a virtual meeting session. The indicia in window 600 correspond to the example described with respect to FIG. 4. In particular, window 600 is an exemplary window of an email client application generated based on event data from an endpoint associated with the endpoint 2 (i.e., the user Francis) in FIG. 4. Window 600 includes indicia 602-620 and user interface button 622. The window corresponds to an email generated based on a subset of events for the user Francis. This particular email may be generated when it is detected that the virtual meeting session has ended. Indicia 602 identify a user identifier. In this case, the user identifier is an email address for the user Francis. Indicia 604 identify a source of the email. In this case, the identifier is an email address associated with a missed content server. Indicia 606 identify a user identifier. In this case, the user identifier is a name for the user Francis. Indicia 608 identify a virtual meeting session with which the email (and the indicia therein) is associated. The meeting is identified by a title "Better Sound Quality", by a time (i.e., ended at 12:50 pm), and by a date indication (i.e., "today"). Indicia 610 indicate that the user was inattentive (and therefore missed some portions of the meeting). Indicia 612 identify a classification (i.e., "Late to meeting"), identify a point in time in the meeting (i.e., time 0:00 in a recording of the meeting), and identify a duration of time relative to the point in time ("12:17" after the point in time). Thus, the indicia 610 indicate that the user "Francis" joined the meeting "Late" and, as a result, missed (e.g., did not view, endpoint was unreachable in some regard) a portion of the meeting beginning at time 0:00 (zero minutes and zero seconds in the meeting record) and ending "12:17" (12 minutes and 17 seconds after the point in time, i.e., at 12:17). Within indicia 612, the point in time (i.e., "0:00" is a hyperlink). Selection of the hyperlink is effective to cause the endpoint to initiate replay of a recording of the virtual meeting session beginning at the point in time. Indicia 614 identify a classification (i.e., "Unresponsive"), identify a point in time in the meeting (i.e., time 22:49 in a recording of the meeting), and identify a duration of time relative to the point in time ("2:05" after the point in time). Thus, the indicia 614 indicate that the user "Francis" was "Unresponsive" and, as a result, missed a portion of the meeting beginning at time 22:49 (22 minutes and 49 seconds in the meeting record) and ending "2:05" (2 minutes and 5 seconds after the point in time, i.e., at 24:54). Within 614, the point in time (i.e., "22:49" is a hyperlink). Selection of the hyperlink is effective to cause the endpoint to initiate replay of a recording of the virtual meeting session beginning at the point in time. In this case, selection of the hyperlink is effective to skip all portions of the recording between the start of the recording and time "22:49" in the recording. Using the indicia and/or hyperlinks provided in window 600, a user (using an endpoint) can immediately jump to only the portions that he/she missed to being playback of the recording of the meeting. The content may be replayed from a data source remote from the endpoint on which the window 600 is displayed. In other examples, the content is replayed from a data source local to the endpoint. Indicia 616 and 618 include content similar to that described with respect to indicia 612 and 614. Indicia 616 groups together, two portions of the virtual meeting session that have a same classification (i.e., "Idle"). The classification and points in time identified in indicia 612, 614, and 618 correspond to endpoint 2 in FIG. 4 and the corresponding description. User interface button 622 is effective to download a copy of the meeting recording. Window 600 displays an output representative of portions (e.g., based on points in time and durations of time) of a virtual meeting session based information stored at a server (e.g., stored in activity record 414). The output identifies a plurality of classifications (e.g., Late to meeting, Unresponsive, Idle, Lost Network Connectivity) associated with a plurality of user identifiers (e.g., "Francis", "Francis@company.com") for a user. This output is customized for a particular user, Francis (e.g., endpoint 2 in FIG. 4). Other custom output may be generated based on a different user (e.g., Kevin).

Figure 7B:
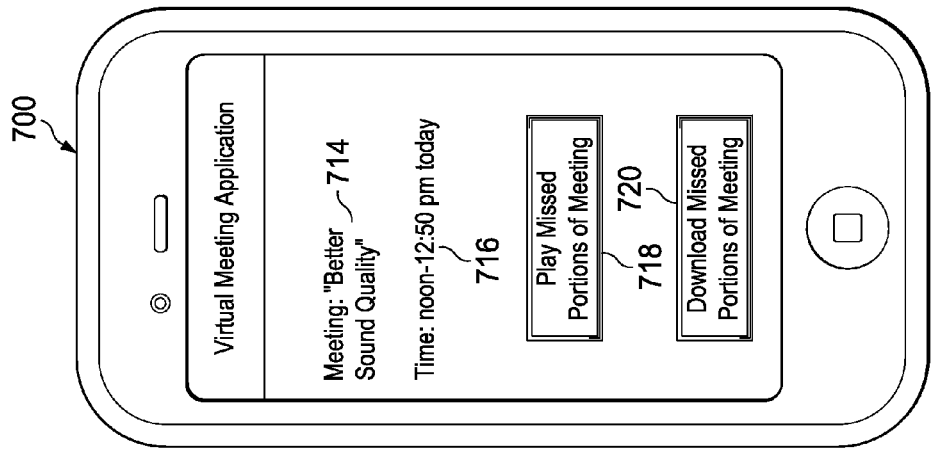
Figure 7A:
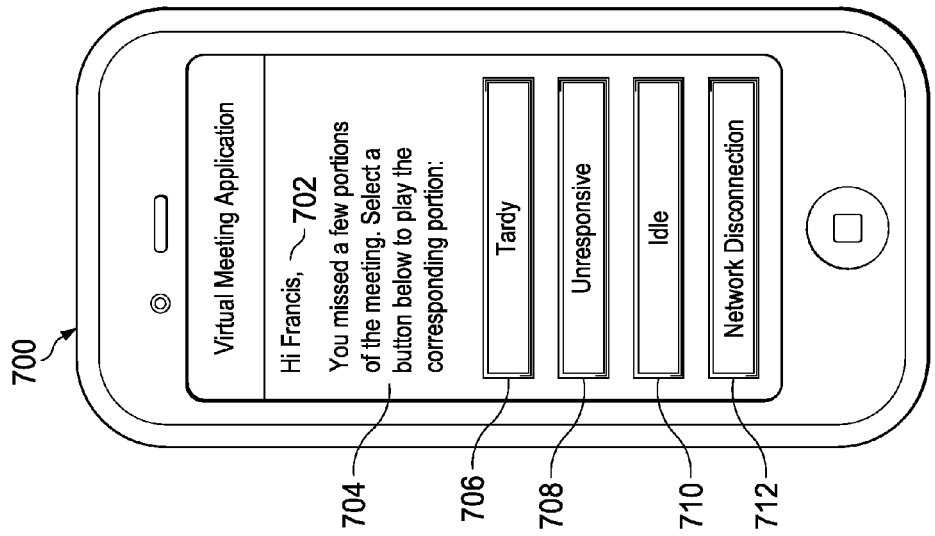

FIGS. 7A and 7B illustrate another exemplary output generated based on a plurality of events in a virtual meeting session. The windows provided on mobile endpoint 700 correspond to the example described with respect to FIG. 4. In particular, the windows provided on mobile endpoint 700 are exemplary windows of a virtual meeting application generated based on event data from an endpoint associated with the user Francis (i.e., endpoint 2 in FIG. 4).

Turning to FIG. 7A, the window includes indicia 702 and 704, and user interface buttons 706, 708, 710, and 712. Indicia 702 identify a user identifier. In this case, the user identifier is a name for the user Francis. Indicia 704 indicate that the user was inattentive (and therefore missed some portions of the meeting). Indicia 704 also identify that clicking any of the user interface buttons 706, 708, 710, or 712 is effective to initiate replay of a correspond portion of a meeting recording (each of the portions correspond to times when the user was associated with an "inactive" status). Each of user interface buttons 706, 708, 710, and 712 is effective to initiate replay of a correspond portion of the meeting recording. In particular, the user interface buttons 706, 708, 710, and 712 initiate replay of a meeting recording at the points in time identified in indicia 612, 614, 616, and 618 (FIG. 6) respectively. The indicia provided in each of user interface buttons identify a classification corresponding to the portions of the recording where the user was inactive (i.e., the user's user identifier was associated with "inactive" status). On the mobile endpoint 700, the classifications are identified using fewer characters than was provided in FIG. 6 (e.g., based on the mobile endpoint having a smaller screen than other devices such as a laptop computer).

Turning to FIG. 7B, another window includes indicia 714 and 716, and user interface buttons 718 and 720. Indicia 714 and 716 identify the virtual meeting session with which the window (and the indicia therein) is associated. Indicia 714 identify the meeting by a title "Better Sound Quality". Indicia 716 identify the meeting by a time (i.e., ended at 12:50 pm) and by a date indication (i.e., "today"). The user interface button 718 is effective to initiate replay of all of the missed portions (and only the missed portions) of the meeting for the user Francis (i.e., the portions where Francis' user identifier was associated with a status value of inactive). In some examples, the missed portions may be replayed with a buffer at either side of the portion (e.g., beginning the replay at a point in the recording 5 sec before the missed portion and ending 5 seconds after the end of the missed portion). The user interface button 720 is effective to initiate download of all of the missed portions (and only the missed portions) of the meeting for the user Francis (i.e., the portions where Francis' user identifier was associated with a status value of inactive).

Figure 8B:
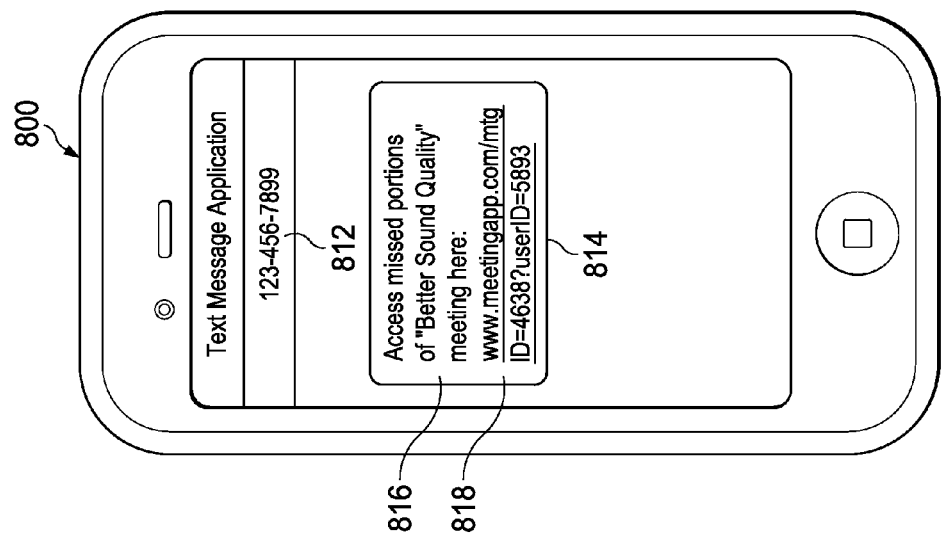
Figure 8A:
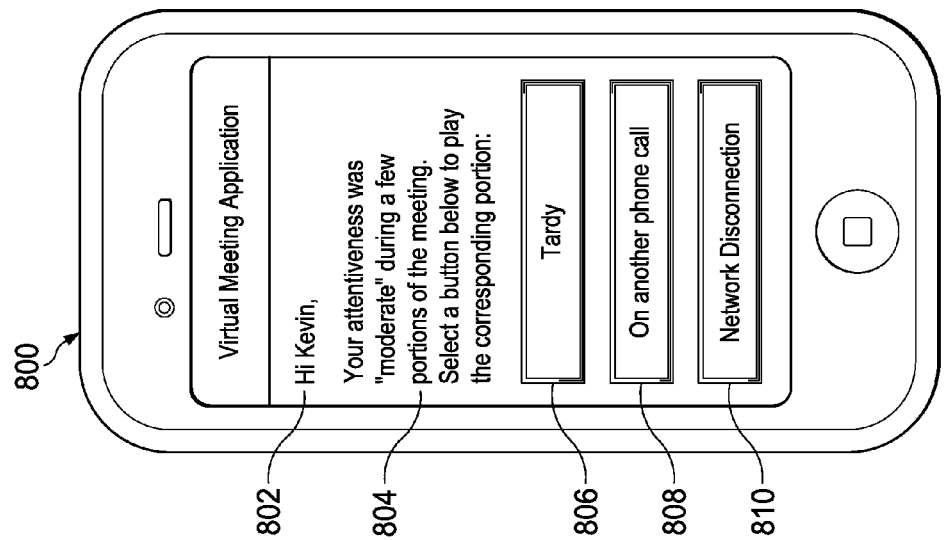
Figure 8C:
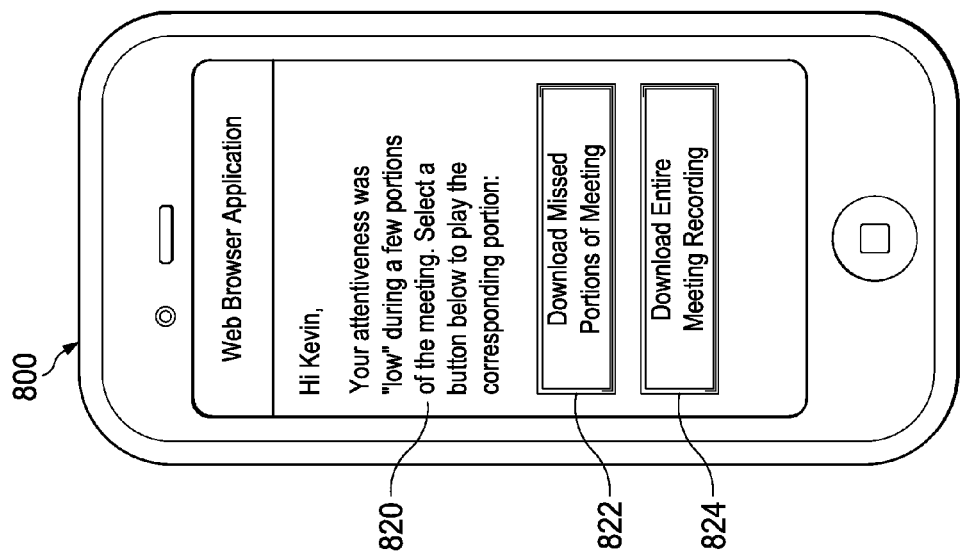

FIGS. 8A, 8B, and 8C illustrate still other exemplary output generated based on a plurality of events in a virtual meeting session. The windows provided on mobile endpoint 800 correspond to the example described with respect to FIG. 4. In particular, the windows are generated based on event data from an endpoint associated with the user Kevin (i.e., endpoint 3 in FIG. 4). In FIG. 8A, the window provided on mobile endpoint 800 is an exemplary window of a virtual meeting application generated based on the event data. In FIG. 8B, the window provided on mobile endpoint 800 is an exemplary window of a text message application generated based on the event data. In FIG. 8C, the window provided on mobile endpoint 800 is an exemplary window of a web browser application generated based on the event data.

Turning to FIG. 8A, the window includes indicia 802 and 804, and user interface buttons 806, 808, and 810. Indicia 802 and 804 include content similar to that described with respect to indicia 702 and 704 (FIG. 7A), respectively. In this example, the indicia correspond to data for Kevin instead of Francis. In addition, the indicia 804 identify a status value of "moderate". Such a status may be utilized in a system with more than two enumerated status values. For example, an exemplary list of status values may include "high", "moderate", and "low" corresponding to high attentiveness of a user, moderate attentiveness of a user, and low attentiveness of a user. The conditions for each status value may be defined in one or more metrics. The user interface buttons 806, 808, and 810 are operable to initiate playback of corresponding portions of a recording of the virtual meeting session (e.g., similar to initiating playback as described with respect to interface buttons 706, 708, 710, and 712 (FIG. 7A)).

Turning to FIG. 8B, the window includes a text message 814 and an identifier 812. The text message includes indicia 816 and hyperlink 818. Indicia 816 identify the virtual meeting session with which the output window (and the output indicia therein) is associated. The meeting is identified by a title "Better Sound Quality". The hyperlink 818 is a link to the webpage illustrated in FIG. 8C. Selecting the hyperlink 818 is effective to cause an endpoint to load the webpage (which may include first launching a web browser application). In other examples, the text message may identify portions of a recording and have a separate link corresponding to each portion.

Turning to FIG. 8C, the window includes indicia 820 and interface buttons 822 and 824. Indicia 820 include, among other things, an identification that a status value for the user is "low" for several portions of the virtual meeting session. The user interface button 822 is effective to initiate downloading all of the portions in which the user is associated with a status value of "low" of the meeting for the user Kevin (e.g., only those portions with a status value of "low"). In some examples, the missed portions may be downloaded with a buffer at either side (or both sides) of each portion. The user interface button 822 is effective to initiate download of the entire meeting recording (i.e., regardless of the status value associated with Kevin).

Figure 9:
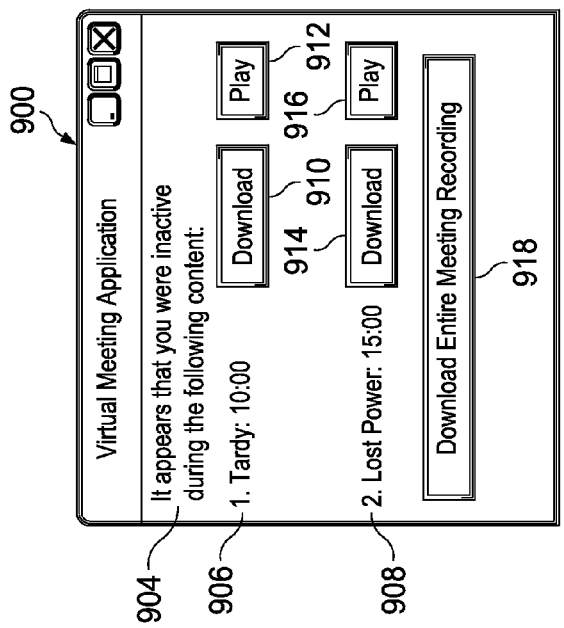

FIG. 9 illustrates yet another exemplary output generated based on a plurality of events in a virtual meeting session. The indicia in window 900 correspond to the example described with respect to FIG. 4. In particular, window 900 is an exemplary window of an virtual meeting application generated based on event data from an endpoint associated with the user Bill (i.e., endpoint 4 in FIG. 4). Window 900 includes indicia 904, 906, and 908, and user interface buttons 910, 912, 914, 916, and 918. This particular email may be generated when it is detected that a virtual meeting session has ended. Indicia 904, 906, and 908 include content similar to that described with respect to indicia 612 and 614 (FIG. 6). User interface buttons 910 and 914 are respectively operable to cause an endpoint to initiate download of portions of a meeting recording that correspond to a "Tardy" classification and a "Lost Power" classification. Similarly, user interface buttons 912 and 916 are respectively operable to cause the endpoint to initiate playback of portions of the meeting recording that correspond to the "Tardy" classification and the "Lost Power" classification. The user interface button 918 is effective to initiate download of the entire meeting recording (i.e., regardless of the status level associated with Bill).

Figure 10:
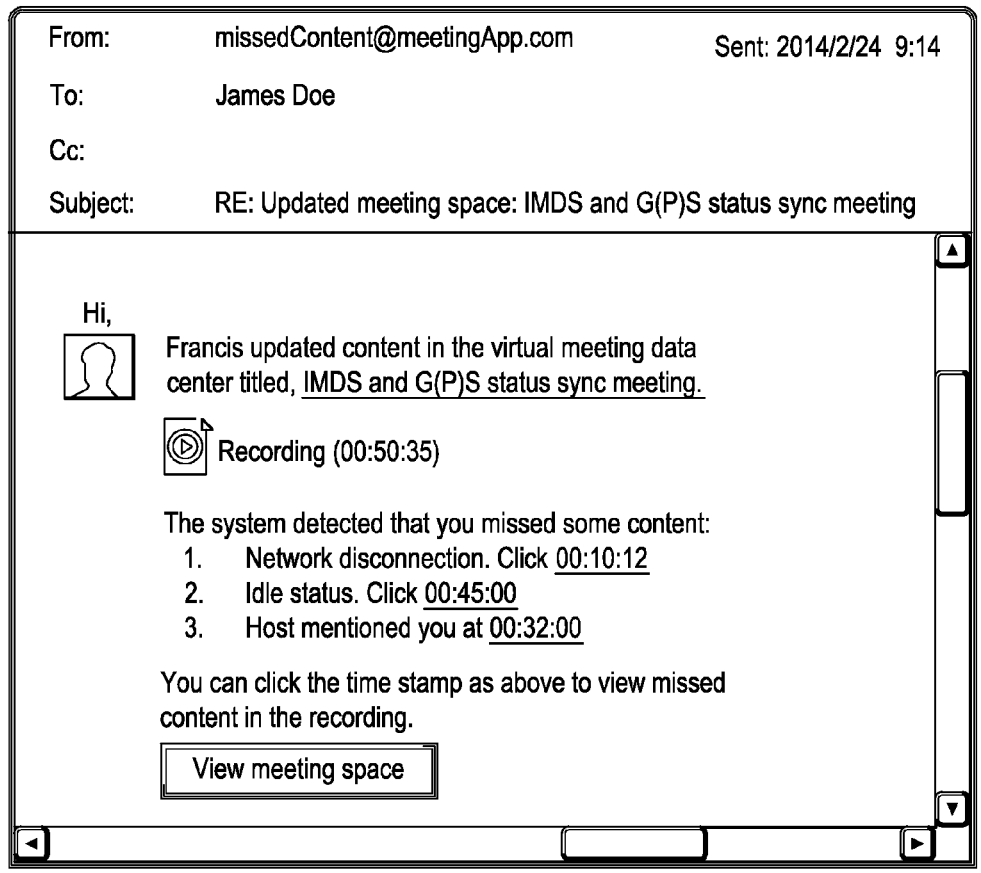

FIG. 10 illustrates exemplary output generated based on a plurality of events in a virtual meeting session. The indicia in the window of FIG. 10 are similar to those described with respect to FIG. 6. In contrast to FIG. 6, the window in FIG. 10 identifies portions of a meeting recording using only a hyperlink identifying a point in time in the recording. Another difference from FIG. 6 is that the email in the window in FIG. 10 includes a copy of a recording of a virtual meeting session (i.e., labeled "Recording (00:50:35)"). The output includes the recording of the virtual meeting session as well as references to the portions of (missed) content from the recording of the virtual meeting session.

Figure 11A:
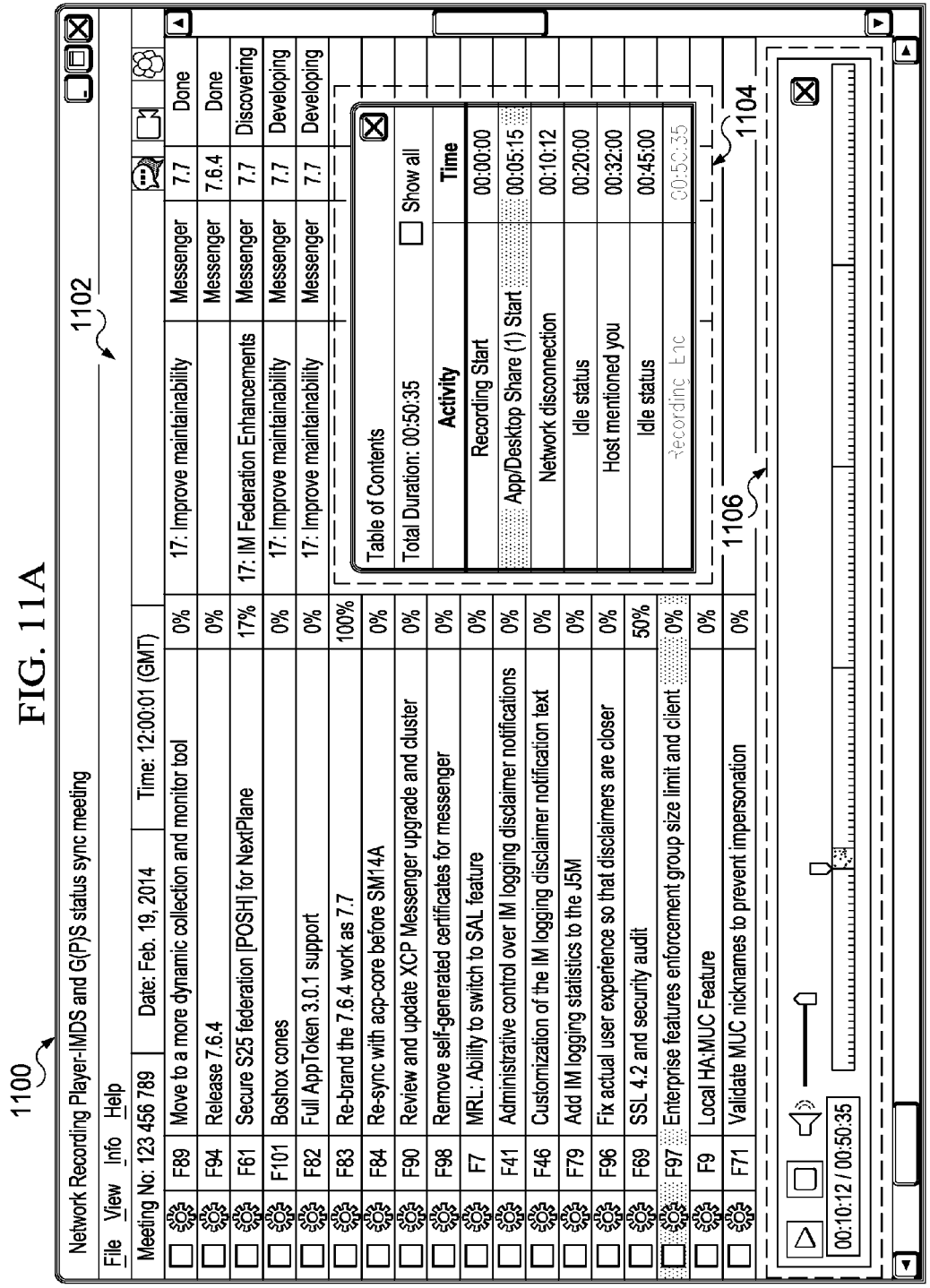
Figure 11B:
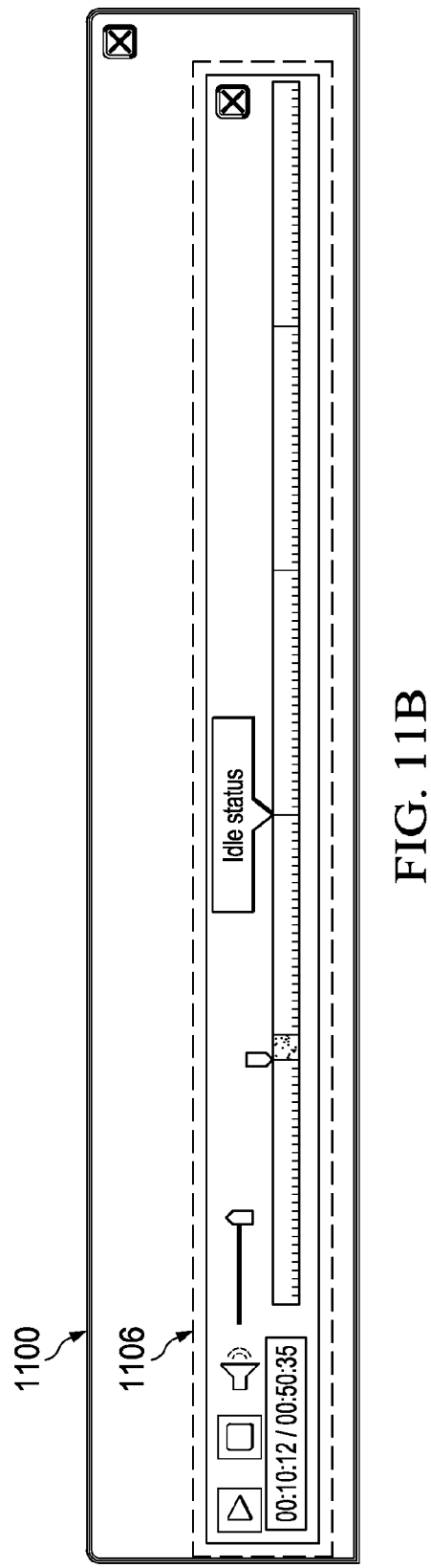

FIG. 11 illustrates another exemplary output generated based on a plurality of events in a virtual meeting session. In particular, window 1100 is an exemplary window for an application operable to playback a recording of a virtual meeting session. In window 1100, a playback application shows, in region 1102, graphical output corresponding to a visual content of the virtual meeting session. Window 1104 overlays region 1102. Window 1104 includes a Table of Contents corresponding to portions of the recording of the virtual meeting session. Each portion corresponds to a duration in the meeting when a particular user identifier was associated with an inactive status. A classification for each portion is listed in the column titled "Activity" in window 1104. In addition, the column titled "time" includes a corresponding timestamp (relative to the overall duration of the recording) at which each portion begins. In this example, the portions include "Network Disconnection", which begins at timestamp 00:10:12 in the recording; "Idle", which begins at timestamp 00:20:00 in the recording; "Host mentioned you", which begins at timestamp 00:32:00 in the recording; "Idle", which begins at timestamp 00:20:00 and again at timestamp 00:45:15 in the recording. Each of the rows in the table of contents is operable to advance playback of the recording the current playback position to a position (e.g., timestamp) corresponding to the selected row. In addition, upon entering window 1100 from a window illustrated in any of FIGS. 6-11, the playback application may play only the portions identified in the table of contents (e.g., skipping any portions not included in the table of contents). In transition between each of the portions, the playback application may skip recording content between the end of a first portion and the beginning of a subsequent portion. Using such an implementation, a user may review only portions of the recording for which the user was associated with an status value of inactive. Component 1106 includes a progress bar associated with playback of the recording of the virtual meeting session. The progress bar highlights the portions with at least one marker. In the progress bar, a vertical line may be used as a marker that identifies a beginning of each portion (which may correspond to the times listed in the Table of Contents). A current playback position is indicated by a location of a triangle proximate the top of the progress bar. Shading is a maker used to identify a duration of a currently playing portion. FIG. 11B illustrates an alternate embodiment where the progress bar further includes a marker including indicia that identify a classification associated with one or more of the portions.

Figure 12:
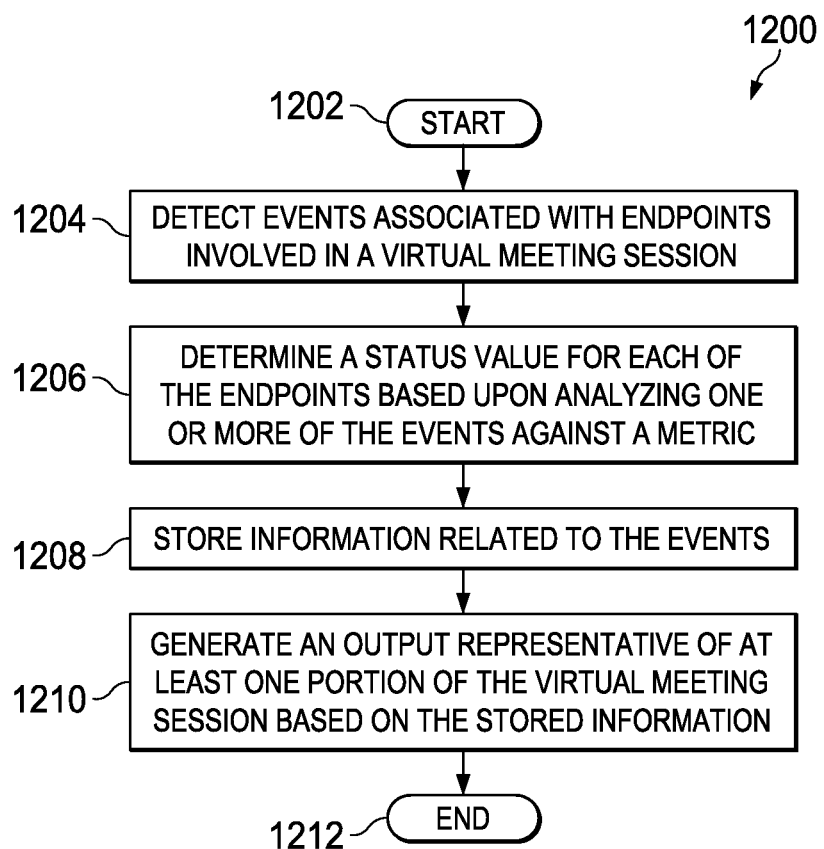
FIG. 12 illustrates exemplary logic according to some embodiment of the present disclosure.

FIG. 12 illustrates exemplary logic according to some embodiment of the present disclosure. Logic 1200 may be implemented by any endpoint or network component. In one implementation, logic 1200 may be provisioned in whole or in part in one or more of servers 144 (e.g., FIG. 1 and/or FIG. 13). In such an implementation, the one or more of servers execute logic 1200 (i.e., in whole or in part in as the case may be). In further embodiments, one or more non-transitory media includes code for execution and when executed by one or more processors performs operations comprised in logic 1200. Logic 1200 begins at 1202. 1202 may coincide with a start or end point of other logic, routines, and/or applications. In addition, at 1202, data (e.g., objects, values, variables, etc.) may be initialized, retrieved, or accessed for use in logic 1200. Logic 1200 advances from 1202 to 1204. At 1204, events associated with endpoints involved in a virtual meeting session are detected (e.g., using an activity manager module). In some examples, such detection requires detecting, during the virtual meeting session, a plurality of events associated with each of a plurality of endpoints connected to the virtual meeting session. Each of the endpoints (i.e., the plurality of endpoints) may be connected to one another via a single, common virtual meeting session. While the virtual meeting session is active (i.e., a meeting is in progress), each endpoint connected to the virtual meeting session may detect states or changes that result in generation of an event. The states may be states of the endpoint itself and/or of devices coupled to the endpoint. The endpoints transmit the events to another endpoint and/or a server. Exemplary events include, e.g., a connection status events, a power event, a power-off event, a power-on event, a communication event, an initiate reply event, a completed reply event, a communication received event, input event, device powering off the event, device powering on event, application terminated event, call received event, call dropped event, call answered event, status change event, inactive status event, active status event, any event described herein, or any other event. In some examples, the association of the events and endpoints may encompass a correspondence between an event and an endpoint from the event was received.

At 1206, a status value for each of the endpoints is determined (e.g., by an activity manager module) based analyzing one or more of the events against a metric. In some examples, such determination requires determining a status value for each of a plurality of endpoints based on analyzing the one or more of a plurality of events against the metric. The status values may be determined in a manner similar to that described with respect to the metrics herein. For example, the metrics may include functions that operate on events (and/or information associated an event) and provide procedures and/or outputs for determining one or more status values based on a condition (or set of conditions) (e.g., logical branches, Boolean, thresholds, etc.) being met.

At 1208, information related to the plurality of events is stored. For example, the information may include (but is not limited to) a user identifier (e.g., a user identifier that is associated with an endpoint that generated an event), an endpoint identifier (e.g., an endpoint from which the event was received), a timestamp (e.g., a timestamp contained in an event object, timestamp of a time at which the event is received, a timestamp of a time at which the event was generated, timestamp stamps for a status value of an endpoint), a type of event (e.g., a type from a list of enumerated types, or any of the events disclosed herein), a status value for an endpoint, and/or metadata for the event. The information related to the plurality of events may be stored for example in a database, an activity record (e.g., activity record 414), and/or any other memory.

At 1210, an output representative of at least one portion of the virtual meeting session is generated based on the stored information. The portion of the meeting session may encompass a duration of time in a recording of a virtual meeting session. The output may include an email, text message, a window in a virtual meeting application, a recording of a virtual meeting session, a progress bar in a recording, any combination of the foregoing, and/or any customized version of the foregoing. In some examples, the output identifies a classification associated with a user identifier. Each of the endpoints in a virtual meeting session is associated with a user identifier. In some examples, a table that includes the correspondence between endpoint identifiers and user identifiers is utilized retrieve a user identifier based on endpoint identifier. Such a table may be utilized to determine which events (generated by an endpoint) correspond to a particular user identifier. All of the events generated in a virtual meeting session may be filtered down to a subset of events associated with the particular user identifier (e.g. retrieving a portion of the stored information from a database and loading into a memory cache). The subset of events may be analyzed using one or more metrics to determine a status value and/or a classification corresponding to the events. The classifications may relate to an attentiveness of a user identified by the user identifier. The determined status value and/or classification may then be associated with the particular user identifier. The output may be generated in a customized fashion for the particular user identifier. The customize output may only identify status values and/or classifications corresponding to the particular identifier. The output may identify specific portions of the virtual meeting session in which the user had a particular status value of classification. Different periods of time that have the same classification or status value may be grouped together in the output. In this example, the output is customizing for each user identifier (e.g., for each user). In some examples, the output may be a combination of different components (e.g., a recording of a virtual meeting and identifier for the recording). In such an example, the output may include any of the following: (1) a single version of the recording of the virtual meeting session is generated and a customized email is generated for each user that was connected to meeting session (each email may identify only the portions for which a particular user was inactive); (2) customized versions of the recording of the virtual meeting session are generated for each user, (e.g., each recording file may be customized by including meta-data (e.g., status values and/or classifications) for the user requesting the download); (3) a single version of the recording of the virtual meeting session is generated including meta-data for all users that were present in the meeting). Upon playback of the recording, the playback application may detect an identity of the user and/or request authentication from the user using the identity of the user and/or the authentication, the system may customize the playback based on the identity of the user (e.g., showing only the portions that were missed by the user playing the recording of the virtual meeting session; (4) The recording of the virtual meeting session is clipped (or otherwise modified) to only include the portions where a particular user was associated with status of inactive. Thus, the recording of the virtual meeting session may be customized by removing portions of the recording based on a user identifier. After the output is generated, logic 1200 advances to 1212. 1212 may coincide with a start or end point of other logic, routines, and/or applications. The windows and/or indicia included in each of FIGS. 6, 7A, 7B, 8A, 8B, 8C, 9, 10, and 11 are an exemplary output generated using logic 1200.

FIG. 13 is a simplified block diagram illustrating one possible example of infrastructure associated with communication system 100. Each of endpoints 112a-e are provisioned with a respective activity management module 82a-e, a respective processor 84a-e, a respective memory element 86a-e, a respective virtual meeting module 90a-e (e.g., a virtual meeting application), a respective Meeting Place module 92a-e, and a respective network interface 88a-e, which includes a respective receiving module and a respective transmitting module for exchanging data (e.g., for exchanging packets in a network environment). Endpoint 112e also includes a telephony module for communicating with telephony network 122. Additionally, FIG. 13 illustrates an example implementation of MCSs/MCC 144 that is similarly provisioned with a activity management module 82f, a processor 84f, and a memory element 86f.

In one example implementation, each endpoint 112a-e and/or MCSs/MCC 144 includes software (e.g., as part of activity management modules 82a-f) to achieve or to support the activity management functions (e.g., based on event, metrics, and/or status values), as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the Figures may include any suitable algorithms, hardware, software, components, modules, interfaces, or objects that facilitate these activity management operations.

It is imperative to note that FIG. 13 is indicative of just one, of the multitude, of example implementations of communication system 100. Any of the modules or elements within endpoints 112a-e and/or MCSs/MCC 144 may readily be replaced, substituted, or eliminated based on particular needs. Furthermore, although described with reference to particular scenarios, where a given module (e.g., virtual meeting modules 90a-e, Meeting Place modules 92a-e, activity management modules 82a-f, etc.) is provided within endpoints 112a-e or MCSs/MCC 144, any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112a-e are representative of any type of client or user wishing to participate in a meeting session in communication system 100 (e.g., or in any other virtual platform or online platform). Furthermore, endpoints 112a-e can be associated with individuals, clients, customers, or end users wishing to participate in a meeting session in communication system 100 via some network. The term 'endpoint' is inclusive of devices used to initiate a communication, such as a computer, a personal digital assistant (PDA), a laptop or electronic notebook, a cellular telephone of any kind (e.g., an iPhone™, a Blackberry™, a Google™ Droid™), an Internet Protocol (IP) phone, a tablet (e.g., an iPad™), or any other device, component, element, or object capable of initiating voice, audio, video, media, and/or data exchanges within communication system 100. Endpoints 112*a-e* may also be inclusive of a suitable interface to the human user, such as a microphone, a display, or a keyboard or other terminal equipment. Endpoints 112*a-e* may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC 144 and web servers 132 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, load balancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1.

Intranet 120, telephony network 122, and Internet 124 represent a series of points or nodes of interconnected communication paths for receiving and transmitting packets of information that propagate through communication system 100. These networks may offer connectivity to any of the devices or endpoints of FIG. 1. Moreover, Intranet 120, telephony network 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, telephony network 122, and Internet 124 can support a transmission control protocol (TCP)/IP, or a user datagram protocol (UDP)/IP in particular embodiments of the present disclosure; however, Intranet 120, telephony network 122, and Internet 124 may alternatively implement any other suitable communication protocol for transmitting and receiving data packets within communication system 100. Note also that Intranet 120, telephony network 122, and Internet 124 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 120, telephony network 122, and Internet 124 can foster all such communications and, further, be replaced by any suitable network components for facilitating the propagation of data between participants in a conferencing session.

It should also be noted that endpoints 112*a-e* and MCSs/MCC 144 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with activity management operations as disclosed herein. In a general sense, the arrangement depicted in FIG. 13 may be more logical in its representations, whereas a physical architecture may include various permutations/combinations/hybrids of these elements.

Note that in certain example implementations, the activity management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 13) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 13) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, activity management module 82*a-f* includes software in order to achieve the activity management functions outlined herein. These activities can be facilitated by MCSs/MCC 144 and/or the various endpoints 112*a-e*. MCSs/MCC 144 and/or endpoints 112*a-e* can include memory elements for storing information to be used in achieving the intelligent activity management functions, as outlined herein. Additionally, MCSs/MCC 144 and/or endpoints 112*a-e* may include a processor that can execute software or an algorithm to perform the activity management controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that in certain example implementations, the activity management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 13) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 13) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, activity manager modules 82a-f include software in order to achieve the activity management functions outlined herein. These activities can be facilitated by MCSs/MCC 144 and/or the various endpoints 112a-f. MCSs/MCC 144 and/or endpoints 112a-f can include memory elements for storing information to be used in achieving the activity management functions, as outlined herein. Additionally, MCSs/MCC 144 and/or endpoints 112a-f may include a processor that can execute software or an algorithm to perform the activity management activity management controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures. Additionally, although described with reference to particular scenarios where MCSs/MCC 144 resides in a particular physical location, MCSs/MCC 144 can reside in any location, provided it has some connectivity to a suitable network.

The terms "virtual meeting" and "online meeting" are used interchangeably throughout the present disclosure. Both terms relate to the broad concept of transmitting and receiving meeting related data between different endpoints that may, e.g., be remote from one another.

It is also important to note that the steps, procedures, and/or logic discussed with reference to FIGS. 1-13 illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in WebEx and Meeting Place conferencing environments or arrangements, the present disclosure may be used in any virtual environment that could benefit from such technology. For example, in certain instances, computers that are coupled to each other in some fashion can utilize the teachings of the present disclosure (e.g., even though participants would be in a face-to-face arrangement). The activity management paradigm disclosed herein could still be respected by those meeting participants even when they are physically co-located. Virtually any configuration that seeks to intelligently control assigning a status to a user (or user identifier) or endpoint (or endpoint identifier) could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   detecting, during a virtual meeting session, a plurality of events associated with each of a plurality of endpoints connected to the virtual meeting session;
   enabling, after the virtual meeting session has ended, playback of content of a plurality of portions of the virtual meeting session that was previously missed by:
      determining one or more status values for each of the plurality of endpoints based on analyzing one or more of the plurality of events against a metric;
      storing information related to a time each of the plurality of events occurred during the virtual meeting session;
      associating the stored information related to the time of each of the plurality of events occurred to a corresponding portion of the plurality of portions of the virtual meeting session, wherein each portion of the plurality of portions of the virtual meeting session is associated with at least one status value of the one or more status values of one of the plurality of endpoints; and
      generating an output that is operable to initiate playback of a recording of at least one portion of the plurality of portions of the virtual meeting session that was previously missed based on the stored information, wherein the output identifies the at least one status value of at least one of the plurality of endpoints for the at least one portion of the plurality of portions of the virtual meeting session.

2. The method of claim 1, further comprising:
detecting that an endpoint of the plurality of endpoints is inactive;
storing an association between a status value indicating inactivity and a user identifier, wherein the user identifier was identified based on an endpoint identifier associated with the endpoint; and
wherein the output identifies points in the virtual meeting session where the user identifier is associated with the status value indicating inactivity.

3. The method of claim 1, wherein the determining the one or more status values for each of the plurality of endpoints comprises:
determining, during the virtual meeting session, a first status value for an endpoint of the plurality of endpoints; and
determining, after the virtual meeting session ends, a second status value for the endpoint of the plurality of endpoints, wherein the first status value and the second status value are associated with a same period of time in the virtual meeting session.

4. The method of claim 1, further comprising determining a classification of attentiveness associated with a user identifier of at least one of the plurality of endpoints; and
wherein the classification is based on events indicative of whether an endpoint is accessing, during the virtual meeting session, shared content in the content in the virtual meeting session.

5. The method of claim 1, wherein the determining the one or more status values for each of the plurality of endpoints based on analyzing the one or more of the plurality of events against the metric comprises:
executing a function that operates, at least in part, on a timestamp associated with the one or more of the plurality of events;
determining whether a result of the function satisfies the metric;
when it is determined that the result of the function satisfies the metric, assigning a first status value to a corresponding endpoint of the plurality of endpoints; and
when it is determined that the result of the function does not satisfy the metric, assigning a second status value to the corresponding endpoint of the plurality of endpoints.

6. The method of claim 5, wherein the function further operates on a sequence in which the one or more of the plurality of events is received and a relative timing between the receiving the one or more of the plurality of events.

7. The method of claim 1, wherein the plurality of events are received from the plurality of endpoints based on a change in detected at each of the plurality of endpoints.

8. One or more non-transitory media that includes code for execution and when executed by one or more processors performs operations comprising:
detecting, during a virtual meeting session, a plurality of events associated with each of a plurality of endpoints connected to the virtual meeting session;
enabling, after the virtual meeting session has ended, playback of content of a plurality of portions of the virtual meeting session that was previously missed by:
determining one or more status values for each of the plurality of endpoints based on analyzing one or more of the plurality of events against a metric;
storing information related to a time each of the plurality of events occurred during the virtual meeting session;
associating the stored information related to the time of each of the plurality of events occurred to a corresponding portion of the plurality of portions of the virtual meeting session, wherein each portion of the plurality of portions of the virtual meeting session is associated with at least one status value of the one or more status values of one of the plurality of endpoints; and
generating an output that is operable to initiate playback of a recording of at least one portion of the plurality of portions of the virtual meeting session that was previously missed based on the stored information, wherein the output identifies the at least one status value of at least one of the plurality of endpoints for the at least one portion of the plurality of portions of the virtual meeting session.

9. The one or more non-transitory media of claim 8, the operations further comprising:
detecting that an endpoint of the plurality of endpoints is inactive;
storing an association between a status value indicating inactivity and a user identifier, wherein the user identifier was identified based on an endpoint identifier associated with the endpoint; and
wherein the output identifies points in the virtual meeting session where the user identifier is associated with the status value indicating inactivity.

10. The one or more non-transitory media of claim 8, wherein the determining the one or more status values for each of the plurality of endpoints comprises:
determining, during the virtual meeting session, a first status value for an endpoint of the plurality of endpoints; and
determining, after the virtual meeting session ends, a second status value for the endpoint of the plurality of endpoints, wherein the first status value and the second status value are associated with a same period of time in the virtual meeting session.

11. The one or more non-transitory media of claim 8, further comprising code that cause the processor to perform the operation of determining a classification of attentiveness associated with a user identifier of at least one of the plurality of endpoints; and
wherein the classification is based on events indicative of whether an endpoint is accessing, during the virtual meeting session, shared content in the content in the virtual meeting session.

12. The one or more non-transitory media of claim 8, wherein the determining the one or more status values for each of the plurality of endpoints based on analyzing the one or more of the plurality of events against the metric comprises:
executing a function that operates, at least in part, on a timestamp associated with the one or more of the plurality of events;
determining whether a result of the function satisfies the metric;
when it is determined that the result of the function satisfies the metric, assigning a first status value to a corresponding endpoint of the plurality of endpoints; and when it is determined that the result of the function does not satisfy the metric, assigning a second status value to the corresponding endpoint of the plurality of endpoints.

13. The one or more non-transitory media of claim 12, wherein the function further operates on a sequence in which the one or more of the plurality of events is received and a relative timing between the receiving the one or more of the plurality of events.

14. The one or more non-transitory media of claim 8, wherein the plurality of events are received from the plurality of endpoints based on a change in detected at each of the plurality of endpoints.

15. An apparatus comprising:
a memory element configured to store electronic code;
a processor operable to execute instructions associated with the electronic code; and
an activity manger module configured to interface with the processor and further configured to:
  detect, during a virtual meeting session, a plurality of events associated with each of a plurality of endpoints connected to the virtual meeting session;
  enable, after the virtual meeting session has ended, playback of content of a plurality of portions of the virtual meeting session that was previously missed by:
    determining one or more status values for each of the plurality of endpoints based on analyzing one or more of the plurality of events against a metric;
    storing information related to a time each of the plurality of events occurred during the virtual meeting session;
    associating the stored information related to the time of each of the plurality of events occurred to a corresponding portion of the plurality of portions of the virtual meeting session, wherein each portion of the plurality of portions of the virtual meeting session is associated with at least one status value of the one or more status values of one of the plurality of endpoints; and
    generating an output that is operable to initiate playback of a recording of at least one portion of the plurality of portions of the virtual meeting session that was previously missed based on the stored information, wherein the output identifies the at least one status value of at least one of the plurality of endpoints for the at least one portion of the plurality of portions of the virtual meeting session.

16. The apparatus of claim 15, wherein the activity manger module is further configured to:
detect that an endpoint of the plurality of endpoints is inactive;
store an association between a status value indicating inactivity and a user identifier, wherein the user identifier was identified based on an endpoint identifier associated with the endpoint; and
wherein the output identifies points in the virtual meeting session where the user identifier is associated with the status value indicating inactivity.

17. The apparatus of claim 15, wherein the determining the one or more status values for each of the plurality of endpoints comprises:
determining, during the virtual meeting session, a first status value for an endpoint of the plurality of endpoints; and
determining, after the virtual meeting session ends, a second status value for the endpoint of the plurality of endpoints, wherein the first status value and the second status value are associated with a same period of time in the virtual meeting session.

18. The apparatus of claim 15, wherein the activity manager module is further configured to determine a classification of attentiveness associated with a user identifier of at least one of the plurality of endpoints; and
wherein the classification is based on events indicative of whether an endpoint is accessing, during the virtual meeting session, shared content in the content in the virtual meeting session.

19. The apparatus of claim 15, wherein the determining the one or more status values for each of the plurality of endpoints based on analyzing the one or more of the plurality of events against the metric comprises:
executing a function that operates, at least in part, on a timestamp associated with the one or more of the plurality of events;
determining whether a result of the function satisfies the metric;
when it is determined that the result of the function satisfies the metric, assigning a first status value to a corresponding endpoint of the plurality of endpoints; and
when it is determined that the result of the function does not satisfy the metric, assigning a second status value to the corresponding endpoint of the plurality of endpoints.

20. The apparatus of claim 19, wherein the function further operates on a sequence in which the one or more of the plurality of events is received and a relative timing between the receiving the one or more of the plurality of events.

21. The apparatus of claim 15, wherein the plurality of events are received from the plurality of endpoints based on a change in detected at each of the plurality of endpoints.

* * * * *

UNITED STATES PATENT AND TRADEMARK OFFICE
CERTIFICATE OF CORRECTION

PATENT NO. : 9,973,551 B2  
APPLICATION NO. : 14/618916  
DATED : May 15, 2018  
INVENTOR(S) : Hua Ouyang et al.

Page 1 of 1

It is certified that error appears in the above-identified patent and that said Letters Patent is hereby corrected as shown below:

On the Title Page

Item (72) Inventors:  
Please replace "Ruwei Liu, Anhui (JP)" with --Ruwei Liu, Hefei (CN)--

Signed and Sealed this  
Twenty-ninth Day of January, 2019

Andrei Iancu  
*Director of the United States Patent and Trademark Office*